United States Patent
Purohit et al.

(10) Patent No.: US 12,472,144 B2
(45) Date of Patent: Nov. 18, 2025

(54) PHARMACEUTICAL COMPOSITION COMPRISING ELIGLUSTAT

(71) Applicant: Amneal Pharmaceuticals LLC, Bridgewater, NJ (US)

(72) Inventors: Parva Yogeshchandra Purohit, Ahmedabad (IN); Paras Rasiklal Vasanani, Ahmedabad (IN); Vikas Maheshbhai Agrawal, Ahmedabad (IN); Kishan Pradipbhai Suchak, Ahmedabad (IN); Sandip Pareshbhai Mehta, Ahmedabad (IN)

(73) Assignee: AMNEAL PHARMACEUTICALS LLC, Bridgewater, NJ (US)

( * ) Notice: Subject to any disclaimer, the term of this patent is extended or adjusted under 35 U.S.C. 154(b) by 0 days.

(21) Appl. No.: 16/790,833

(22) Filed: Feb. 14, 2020

(65) Prior Publication Data
US 2020/0222310 A1 Jul. 16, 2020

Related U.S. Application Data

(63) Continuation-in-part of application No. 16/637,422, filed as application No. PCT/IB2018/055900 on Aug. 6, 2018.

(30) Foreign Application Priority Data

Aug. 8, 2017 (IN) ............................. 201721028195
Aug. 6, 2018 (WO) .......................... IB2018/055900

(51) Int. Cl.
A61K 9/00 (2006.01)
A61K 31/4025 (2006.01)

(52) U.S. Cl.
CPC ............ *A61K 9/006* (2013.01); *A61K 9/0056* (2013.01); *A61K 31/4025* (2013.01)

(58) Field of Classification Search
CPC ............................ A61K 9/006; A61K 31/4025
See application file for complete search history.

(56) References Cited

U.S. PATENT DOCUMENTS

| | | | |
|---|---|---|---|
| 7,067,116 B1 | 6/2006 | Bess et al. | |
| 8,389,517 B2 | 3/2013 | Ibraghimov-Beskrovnaya et al. | |
| 2013/0137743 A1* | 5/2013 | Liu | A61K 31/4025 548/526 |
| 2014/0037734 A1* | 2/2014 | Yang | A61K 31/44 427/2.14 |
| 2014/0336174 A1 | 11/2014 | Ibraghimov-Beskrovnaya et al. | |
| 2015/0038594 A1 | 2/2015 | Borges et al. | |
| 2015/0250856 A1 | 9/2015 | Schwarz et al. | |
| 2016/0331693 A1* | 11/2016 | Edalat | A61P 15/10 |
| 2017/0129869 A1 | 5/2017 | Velaga et al. | |
| 2018/0000725 A1* | 1/2018 | Lee | A61K 9/006 |
| 2019/0142782 A1* | 5/2019 | Spedding | A61K 31/4025 514/475 |
| 2019/0388392 A1* | 12/2019 | Ahmed | A61K 9/2031 |

FOREIGN PATENT DOCUMENTS

| | | | | |
|---|---|---|---|---|
| WO | WO-2016001885 A2 * | 1/2016 | ............... | A61K 9/10 |
| WO | WO 2016038616 | 3/2016 | | |
| WO | 2017068496 A1 | 4/2017 | | |
| WO | 2019082209 A1 | 5/2019 | | |

OTHER PUBLICATIONS

Mansur et al (Brazilian Journal of Medical and Biological Research, 1998, vol. 31, pp. 691-696) (Year: 1998).*
Narang et al (International Journal of Pharmacy and Pharmaceutical Sciences, 2011, vol. 3, pp. 18-22) (Year: 2011).*
Prajapati et al (International Journal of Pharmaceutical Investigation, 2014, vol. 4, pp. 27-31) (Year: 2014).*
Balwani et al., Recommendations for the Use of Eliglustat in the Treatment of Adults with Gaucher Disease Type 1 in the United States; Molecular genetics and Metabolism, vol. 117, Issue 2, Feb. 2016, pp. 95-103.
International search report and Written Opinion mailed on Nov. 30, 2018 in PCT application No. PCT/IB 18/55900.

* cited by examiner

*Primary Examiner* — Mark V Stevens
(74) *Attorney, Agent, or Firm* — Troutman Pepper Locke LLP

(57) ABSTRACT

The present invention relates to a pharmaceutical composition comprising glucosylceramide synthase inhibitor and a one or more pharmaceutically acceptable excipients. The present invention specifically relates to a sublingual pharmaceutical composition of eliglustat or a pharmaceutically acceptable salt thereof and a one or more pharmaceutically acceptable excipients. Moreover, the present invention further relates to a pharmaceutical composition of eliglustat or a pharmaceutically acceptable salt thereof which is used in the treatment of individual with lysozymal storage diseases selected from the group consisting of, Gaucher disease, Sphingolipidoses, Farber disease, Krabbe disease, Fabry disease, Schindler disease, Tay-Sachs disease and Niemann-Pick disease.

17 Claims, 3 Drawing Sheets

PHARMACEUTICAL COMPOSITION COMPRISING ELIGLUSTAT

RELATED APPLICATIONS

This application is a continuation-in-part of U.S. patent application Ser. No. 16/637,422, filed Feb. 7, 2020, which claims priority to International Application No. PCT/IB2018/055900, filed Aug. 6, 2018, which claims priority to Indian Provisional Patent Application No. IN 201721028195, filed Aug. 8, 2017. The disclosures of all applications noted above are hereby incorporated by reference herein in their entireties.

TECHNICAL FIELD

The present invention relates to a pharmaceutical composition comprising glucosylceramide synthase inhibitor and at least one pharmaceutically acceptable excipient. Specifically, the present invention relates to a transmucosal pharmaceutical composition comprising eliglustat or a pharmaceutically acceptable salt thereof and at least one pharmaceutically acceptable excipient. Further, the present invention relates to pharmaceutical composition with reduced dose of eliglustat or a pharmaceutically acceptable salt thereof for the treatment of one or more lysosomal storage diseases.

BACKGROUND ART

Lysosomal storage diseases are a group of rare, inborn, metabolic errors characterized by deficiencies in normal lysosomal function and by intra lysosomal accumulation of undegraded substrates. They are typically characterized by storage of a variety of substrates in multiple tissues, organs and by the variable association of unusual clinical manifestations that are often responsible for physical and neurological handicaps.

Gaucher disease type 1, one of the most common forms of lysosomal storage diseases, is a rare autosomal recessive condition resulting from mutations in the glucocerebrosidase (GBA) gen encoding the glucosylceramidase enzyme. In Gaucher disease type 1, the lipid glucosylceramide accumulates in Gaucher cells in organs including the spleen and liver due to insufficient production of the enzyme glucosylceramidase. This leads to clinical manifestations that include enlargement of the spleen and liver, skeletal complications, anaemia and thrombocytopenia.

The current standard of care for Gaucher disease type 1 is enzyme replacement with imiglucerase (recombinant human glucosylceramidase), which can reverse or halt disease progression but is expensive and requires frequent intravenous infusions for the rest of the patient's life. Lifelong intravenous administration, costs and inability of enzyme replacement therapy to reach the CNS and potentially other sites encompass the most important limitations of this treatment modality. Moreover, enzyme replacement therapy is associated with a potential risk of hypersensitivity reactions and, rarely, the development of antibodies to the enzyme that reduce its efficacy.

Substrate reduction therapy aims to decrease the amount of accumulating material by inhibiting its synthesis. Substrate reduction therapy has benefits that could overcome some drawbacks of enzyme replacement therapy. Currently, oral substrate reduction therapy with agents such as miglustat and eliglustat represents an alternative treatment strategy for Gaucher disease type 1.

Eliglustat is a small-molecule oral glucosylceramide analogue for the long-term treatment of Gaucher disease type 1. It is the first oral treatment approved as a first-line use in patients with Gaucher disease type 1 who are CYP2D6 extensive metabolizers (EMs), intermediate metabolizers (IMs), or poor metabolizers (PMs). Eliglustat is a strong inhibitor of glucosylceramide synthase that resembles the ceramide substrate for the enzyme and inhibition of this enzyme reduces the accumulation of glucosylceramide.

Eliglustat is marketed under CERDELGA® brand name which is a hard gelatin capsules containing eliglustat tartrate, with the chemical name N-((1R,2R)-1-(2,3-dihydrobenzo [b] [1,4] dioxin-6-yl)-1-hydroxy-3-(pyrrolidin-1-yl) propan-2-yl) octanamide (2R,3R)-2,3-dihydroxysuccinate. Its molecular weight is 479.59, and the empirical formula is C23H36N2O4+½(C4H6O6) with the following chemical structural Formula-I:

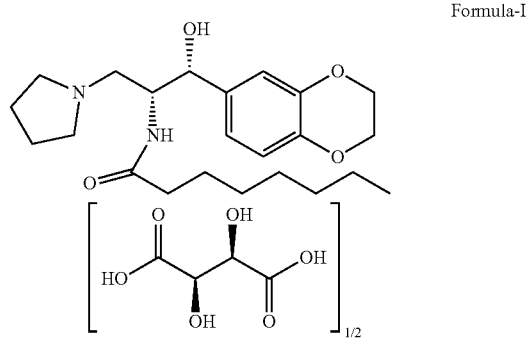

Formula-I

Eliglustat is a BCS class I drug substance characterized by high solubility, high permeability and rapidly absorption. However, the drug has a very low oral bioavailability (<5%) as it undergoes significant first pass metabolism.

As mentioned in CERDELGA® capsule product label, eliglustat is extensively metabolized with a high clearance, mainly by CYP2D6 and to lesser extent CYP3A4 enzymes. At a given dose, the systemic exposure (Cmax and AUC) depends on the CYP2D6 phenotype. In CYP2D6, EMs and IMs, the eliglustat pharmacokinetics is time-dependent and the systemic exposure increases in a more than dose proportional manner. After multiple oral doses of 84 mg twice daily in EMs, eliglustat systemic exposure (AUC0-12) increased up to about 2-fold at steady state compared to after the first dose ($AUC_{0\text{-}inf}$). The pharmacokinetics of eliglustat in CYP2D6 PMs is expected to be linear and time-independent. Compared to EMs, the systemic exposure following 84 mg twice daily at steady state is 7 to 9 fold higher in PMs. The selection of patient with Gaucher disease type 1 is based on their CYP2D6 metabolizer status.

Eliglustat is predominantly metabolized by CYP2D6, participants with genotypes corresponding to slower CYP2D6 metabolism exhibited higher exposure. There was, however, large between-subject variability in exposure within each metabolizer status category and substantial overlap between categories, precluding dose recommendations based solely on CYP2D6 genotype. Genz-99067 displayed high CL/F and Vz/F. In vitro human metabolic stability studies indicate Genz-99067 will exhibit a significant first-pass effect.

This was observed in mice, rats, and dogs, where Genz-99067 at a 50-mg/kg dose was shown to have an oral bioavailability of 8%, 39%, and 42%, respectively. In the phase 1 food effect study, the presence of food did not affect the extent of absorption, and only a slight delay was seen in the rate of absorption. Therefore, it is concluded that eliglustat tartrate can be administered safely without regard to meals.

As per the approved product CERDELGA® capsule dosing regimen, it is recommended that patient CYP2D6 genotypes should be established using an FDA-cleared test before starting therapy. The recommended dosage of CERDELGA® capsule is 84 mg twice daily in CYP2D6 EMs and IMs. The recommended dosage in CYP2D6 PMs is 84 mg once daily; appropriate adverse event monitoring is recommended.

As mentioned in European Assessment report for an initial marketing authorization application of CERDELGA® capsule published by Committee for Medicinal Products for Human Use (CHMP), the absolute bioavailability of eliglustat is 4.49%±4.13% and the absolute bioavailability was predicted to be approximately 20 times greater for CYP2D6 PMs compared with CYP2D6 EMs.

Lesley et. al, Drugs (2015) 75: 1669-1678 has also mentioned that, eliglustat has a low oral bioavailability of less than 5% due to significant first-pass metabolism.

WO2001004108 A1 patent application discloses the pharmaceutical composition comprising eliglustat. In particular, the example 3 of WO 2001004108 A1 discloses the pharmaceutical composition comprising eliglustat that can be administered orally (e.g., tablets, dragees and capsules), rectally (e.g. suppositories), as well as administration by injection.

As per Shojaei A H, et al. Buccal mucosa as a route for systemic drug delivery: a review. Journal of Pharmacy and Pharmaceutical Sciences. 1:15-30, 1998, Sublingual delivery is preferred as the sublingual mucosa is more readily permeable to medications than other mucosal areas, such as the buccal mucosa, resulting in more rapid uptake Hence, there is a long unmet need to develop a suitable pharmaceutical composition which can improve the absolute bioavailability of eliglustat in comparison to marketed CERDELGA® capsule.

Also, there exists a need to improve the currently approved CERDELGA® capsule product dosing regimen for Gaucher disease type 1 which first requires determination of types of patients based on FDA-cleared test for determining CYP2D6 genotype of patients i.e. extensive metabolizers (EMs), intermediate metabolizers (IMs) and poor metabolizers (PMs).

Surprisingly, the inventors of the present invention have addressed the above problems of eliglustat with currently approved product by improving the absolute bioavailability of eliglustat through transmucosal route which circumvents first pass hepatic metabolism. Also, the present invention provides the dose reduction of eliglustat through transmucosal route for Gaucher disease type 1 treatment in comparison to currently approved product.

SUMMARY OF INVENTION

The present invention relates to a pharmaceutical composition comprising glucosylceramide synthase inhibitor and at least one pharmaceutically acceptable excipient.

The present invention further relates to a transmucosal pharmaceutical composition comprising eliglustat or a pharmaceutically acceptable salt thereof and at least one pharmaceutically acceptable excipient for the treatment of individuals with one or more lysosomal storage diseases.

Further the present invention relates to pharmaceutical composition with reduced dose of eliglustat or a pharmaceutically acceptable salt thereof for the treatment of one or more lysosomal storage diseases selected from the group comprising of, Gaucher disease, Sphingolipidoses, Farber disease, Krabbe disease, Fabry disease, Schindler disease, Tay-Sachs disease and Niemann-Pick disease.

In particular the present invention relates to a sublingual pharmaceutical composition comprising eliglustat tartrate and at least one pharmaceutically acceptable excipient which provides enhanced bioavailability and dose reduction aspect in comparison to marketed formulation.

The present invention relates to a transmucosal pharmaceutical composition comprising eliglustat or a pharmaceutically acceptable salt thereof and one or more pharmaceutically acceptable excipient, capable of improving the bioavailability of eliglustat through transmucosal route which circumvents first pass hepatic metabolism. The present invention provides transmucosal compositions having benefits over oral composition of the eliglustat or a pharmaceutically acceptable salt thereof and one or more pharmaceutically acceptable excipient, wherein the composition has improved pharmacokinetic profile and at least one of the pharmacokinetic parameter is improved in transmucosal composition as compared to oral composition, wherein the pharmacokinetic parameter is selected from $C_{max}$, $AUC_{(0-t)}$ or $AUC_{0-inf}$.

In another embodiment, the present invention provides compositions having benefits over oral composition of the eliglustat or a pharmaceutically acceptable salt thereof and one or more pharmaceutically acceptable excipient, including improving bioavailability, increasing $C_{max}$, increasing $AUC_{(0-t)}$ and increasing $AUC_{0-inf}$.

Further the present invention relates to transmucosal composition with reduced dose of eliglustat or a pharmaceutically acceptable salt thereof and one or more pharmaceutically acceptable excipient; wherein the therapeutically effective dose is reduced by at least about 10% or more than that of the orally administered pharmaceutical composition.

In an another embodiment, the present invention provides sublingual pharmaceutical compositions having benefits over oral composition of the eliglustat or a pharmaceutically acceptable salt thereof and one or more pharmaceutically acceptable excipient, wherein the composition has improved pharmacokinetic profile and at least one of the pharmacokinetic parameter is improved in sublingual composition as compared to oral composition, wherein the pharmacokinetic parameter is selected from $C_{max}$, $AUC_{(0-t)}$ or $AUC_{0-inf}$.

Further the present invention relates to sublingual composition with reduced dose of eliglustat or a pharmaceutically acceptable salt thereof and one or more pharmaceutically acceptable excipient; wherein the therapeutically effective dose is reduced by at least about 10% or more than that of the orally administered pharmaceutical composition.

In an another embodiment, the present invention provides sublingual compositions having benefits over oral composition of the eliglustat or a pharmaceutically acceptable salt thereof and one or more pharmaceutically acceptable excipient, wherein the composition has improved pharmacokinetic profile and at least one of the pharmacokinetic parameter is improved in sublingual composition as compared to oral composition and the therapeutically effective dose is reduced by at least about 10% or more than that of the orally administered pharmaceutical composition; wherein the pharmacokinetic parameter is selected from $C_{max}$, $AUC_{(0-t)}$ or $AUC_{0-inf}$.

In an another embodiment, the present invention provides method of treating Gaucher's disease, comprising administering transmucosal compositions having benefits over oral composition of the eliglustat or a pharmaceutically acceptable salt thereof and one or more pharmaceutically acceptable excipient, wherein the composition has improved pharmacokinetic profile and at least one of the pharmacokinetic parameter is improved in transmucosal composition as compared to oral composition and the therapeutically effective dose is reduced by at least about 10% or more than that of the orally administered pharmaceutical composition; wherein the pharmacokinetic parameter is selected from $C_{max}$, $AUC_{(0-t)}$ or $AUC_{0-inf}$.

In an another embodiment, the present invention provides method of treating Gaucher's disease, comprising administering sublingual compositions having benefits over oral composition of the eliglustat or a pharmaceutically acceptable salt thereof and one or more pharmaceutically acceptable excipient, wherein the composition has improved pharmacokinetic profile and at least one of the pharmacokinetic parameter is improved in sublingual composition as compared to oral composition and the therapeutically effective dose is reduced by at least about 10% or more than that of the orally administered pharmaceutical composition; wherein the pharmacokinetic parameter is selected from $C_{max}$, $AUC_{(0-t)}$ or $AUC_{0-inf}$.

In an another embodiment, the present invention provides method of treating Gaucher's disease comprising sublingual compositions having benefits over oral composition of the eliglustat or a pharmaceutically acceptable salt thereof and one or more pharmaceutically acceptable excipient, wherein the composition has improved pharmacokinetic profile and at least one of the pharmacokinetic parameter is improved in sublingual composition as compared to oral composition, where the pharmacokinetic parameter is selected from $C_{max}$, $AUC_{(0-t)}$ or $AUC_{0-inf}$. In particular the present invention relates to method of treating Gaucher's disease comprising administering transmucosal pharmaceutical composition comprising eliglustat or its pharmaceutical acceptable salts having bioavailability of said drug from 2 to 80 times as compared to the oral pharmaceutical composition.

In an another embodiment, the method of treating the Gaucher's disease type 1, in a human or animal subject, wherein the method comprising sublingually administering a composition comprising a therapeutically-effective amount of eliglustat or its pharmaceutically acceptable salts thereof and one or more pharmaceutically acceptable excipient; and wherein the dose of the eliglustat or its pharmaceutically acceptable salts to be administered via sublingually is about 0.1 mg to about 30 mg.

In an embodiment the invention provides a transmucosal pharmaceutical composition comprising eliglustat or its pharmaceutical acceptable salts and at least one or more pharmaceutically acceptable excipient wherein the composition has improved pharmacokinetic profile as compared to the same dose of eliglustat or its pharmaceutical acceptable salts administered by oral pharmaceutical composition.

In an embodiment the invention provides a method of treating Gaucher's disease type 1 comprising the administration of transmucosal pharmaceutical composition comprising eliglustat or a pharmaceutically acceptable salt thereof and at least one or more pharmaceutically acceptable excipient to the subject in need thereof wherein the transmucosal composition has therapeutically effective dose at least 10% lower than the oral pharmaceutical composition; wherein the transmucosal composition provides equal or an improved pharmacokinetic profile in the subject in comparison to the oral pharmaceutical composition.

In an embodiment the invention provides a transmucosal pharmaceutical composition comprising therapeutically effective amount of eliglustat and its pharmaceutically acceptable salts thereof and one or more pharmaceutically acceptable excipient, wherein the therapeutic amount of the eliglustat or its pharmaceutically acceptable salts is selected from about 0.1 mg to about 30 mg.

In an embodiment the invention provides a transmucosal pharmaceutical composition comprising eliglustat or its pharmaceutical acceptable salts and at least one or more pharmaceutically acceptable excipient, wherein the transmucosal composition is with reduced therapeutic dose in comparison to oral pharmaceutical composition and the reduced therapeutic dose provides an equivalent or better therapeutic efficacy in comparison to oral pharmaceutical composition.

DETAILED DESCRIPTION

Figure 1:
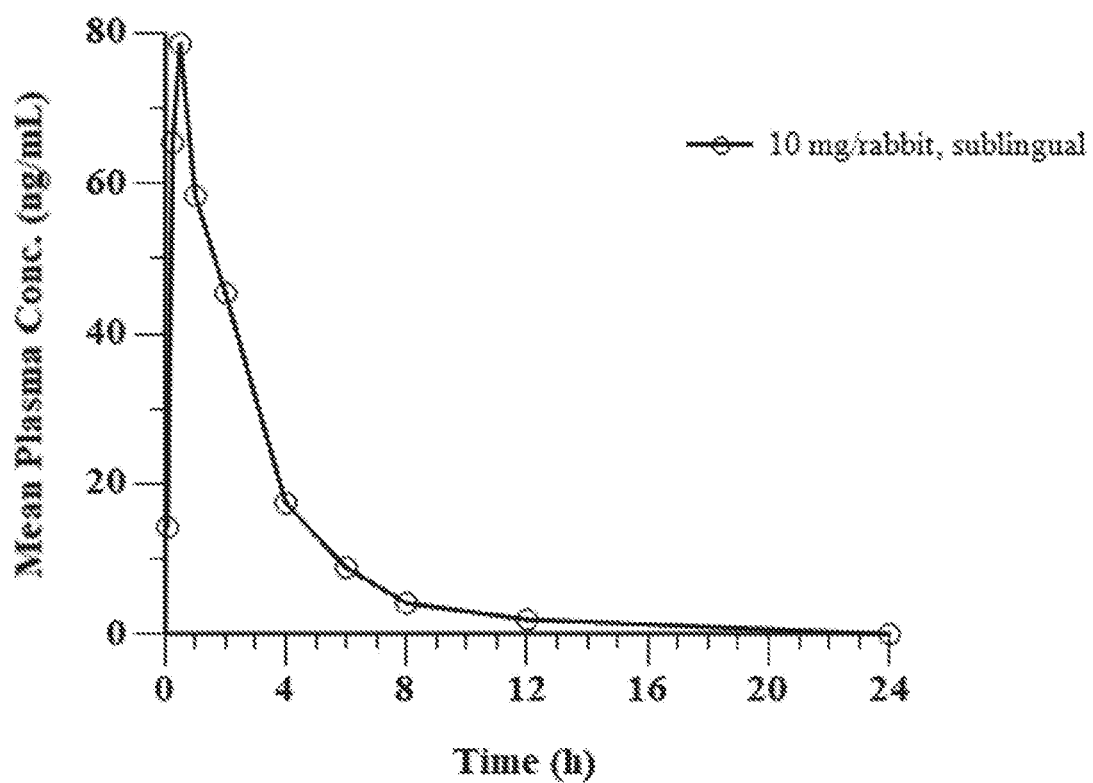
FIG. 1 is a graph showing concentration-time profile of Eliglustat tartrate following sublingual administration Oral thin film (sublingual) in male New Zealand White Rabbits.

The present invention relates to a pharmaceutical composition comprising glucosylceramide synthase inhibitor and at least one pharmaceutically acceptable excipient.

Specifically, the present invention relates to a transmucosal pharmaceutical composition of eliglustat or a pharmaceutically acceptable salt thereof and at least one pharmaceutically acceptable excipient for the treatment of individuals with one or more lysosomal storage diseases.

In particular, the present invention relates to a sublingual pharmaceutical composition comprising eliglustat or a pharmaceutically acceptable salt thereof and a process of preparing the said pharmaceutical composition.

The present invention addresses major problems associated with the currently approved oral therapy in individuals with Gaucher disease type 1 using eliglustat or a pharmaceutically acceptable salt thereof. Eliglustat is extensively metabolized with a high clearance, mainly by CYP2D6 and to lesser extent CYP3A4 enzymes. At a given dose, the systemic exposure (Cmax and AUC) depends on the CYP2D6 phenotype and it has a very low oral bioavailability of less than 5% through oral route. Also, as mentioned in marketed product CERDELGA® capsule label, no active metabolites have been identified for eliglustat after metabolizing through CYP2D6 enzyme.

The inventors of the present invention have found that the transmucosal administration of eliglustat or a pharmaceutically acceptable salt thereof, specifically sublingual administration offers substantial advantages over oral route by offering improved bioavailability of eliglustat which leads to reduction in administered dose amount in comparison to marketed available CERDELGA® capsule. One of the main advantages of the sublingual administration is the fact that it circumvents exposure of drugs to digestive enzymes in the gastrointestinal tract and avoids the first pass effect from hepatic enzymes immediately upon absorption. The direct access to blood circulation in addition to the avoidance of any metabolism of the drug results in achieving quickly the maximum levels of the active ingredient in the plasma. Thus, a faster onset of pharmacological effects of the drug in patients is achieved in comparison to conventional oral delivery where the composition is swallowed and also dose reduction is possible. Also, the present invention improves the currently approved CERDELGA® capsule product dosing regimen for Gaucher disease type 1 which first requires determination of types of patients based on FDA-cleared test for determining CYP2D6 genotype of patients i.e. extensive metabolizers (EMs), intermediate metabolizers (IMs) and poor metabolizers (PMs).

The term "eliglustat" encompasses the compound eliglustat or its pharmaceutically acceptable salts or esters or pro drugs thereof or the active metabolites of eliglustat or any of their polymorphs, solvates, hydrates, and combinations thereof such as hydrated salts of eliglustat. It is very well understood that unless and otherwise specified in specification, the term "drug" cover eliglustat or its pharmaceutically acceptable salts and can be used interchangeably.

The term "transmucosal" refers to a drug administration route through mucosal lining including the mucosal linings of the nasal, rectal, vaginal, ocular, or oral cavity. Specifically, in present invention, the term "transmucosal" refers to a drug administration route through mucosal linings of the oral cavity i.e. sublingual and buccal. The inventors of present invention have emphasized specifically on administration of pharmaceutical composition through sublingual route throughout specification, however, administration of pharmaceutical composition is not limited by sublingual route, it may be administered through other transmucosal routes i.e. buccal, gingival or a like thereof.

As used herein, the term "therapeutically effective amount" refers to the amount of eliglustat that is capable of achieving a therapeutic effect in individuals in need of treatment of one or more lysosomal storage disease.

A "pharmaceutically acceptable salt" means any non-toxic salt or salt of an ester of a compound which upon administration into a patient is capable of providing, either directly or indirectly, a compound of this invention. Suitable examples of pharmaceutically acceptable salts include a tartrate, succinate, maleate, fumarate, malate, hydrochloride, hydrobromide, sulfate etc.

The term "about" refers to any value which lies within the defined range by present inventors from a variation of up to ±10% of the claimed value.

The term "stable" means a drug substance and/or pharmaceutical composition for pharmaceutical use which remains stable as per ICH guidelines and/or pharmacopoeia guidelines.

The term "shelf life" refers to storage stability time period during which drug product and/or drug substance expected to remain stable within defined specification as per ICH guidelines and/or pharmacopoeia guidelines.

The term "$T_{max}$" as used herein means the time point of maximum observed plasma concentration. The term "$C_{max}$" refers to the mean maximum plasma concentration after administration of the composition to a subject.

The term "AUC" refers to the mean area under the plasma concentration-time curve value after administration of the compositions formed herein. It represents the total amount of drug absorbed by the body, irrespective of the rate of absorption. The $AUC_{0-inf}$ of a transmucosal dosage form compared to that of the same dosage administered oral formulation serves as the basis for a measurement of bioavailability. AUC includes both the parameter such as $AUC_{0-t}$ and $AUC_{0-inf}$.

The term "disintegration" as used herein means the physical process by which a tablet, film or dosage form breaks down and pertains to the physical integrity of the tablet, film or dosage form alone. This can occur via a number of different ways including breaking into smaller pieces and ultimately, fine and large particulates or, alternatively, eroding from the outside in until the tablet or film has disappeared.

The term "dissolution" as used herein means the process by which the active ingredient is dissolved from the tablet, film or dosage form in the presence of a solvent, in vitro, or physiological fluids in vivo, e.g., saliva, irrespective of the mechanism of release, diffusion of erosion.

The term "improved pharmacokinetic" or "improved pharmacokinetic profile" as used herein represents the enhancement in the absorption, bioavailability, distribution, metabolism or excretion. The improved pharmacokinetics also preferably includes the increase in bioavailability of drug. According to the present invention the improved pharmacokinetic includes enhancement in parameters which preferably includes at least one of $C_{max}$, $AUC_{(0-t)}$ or $AUC_{0-inf}$.

The term "bioavailability" as used herein represents the fraction of drug absorbed from a test article as compared to the same drug when administered orally. It is calculated from the $AUC_{0-inf}$ of the test article following delivery via the intended route versus the $AUC_{0-inf}$ for the same drug after oral administration.

The term "subject" includes any subject, generally a mammal (e.g., human, canine, feline, equine, bovine, ungulate, Rabbit etc.), adult or child, in which treatment for a disorder is desired. The terms "subject" and "patient" may be used interchangeably herein.

The term "transmucosal drug delivery" as used herein refers to a dosage form wherein drug delivery occurs substantially via the transmucosal route and not via swallowing followed by GI absorption. The dosage forms of the current invention are designed to provide for a drug dissolution rate that allows for maximal delivery via the oral mucosa, typically via placement of the dosage form within the sublingual cavity.

The term "oral composition" or "oral pharmaceutical composition" as used herein refers to a dosage form wherein drug is delivered via swallowing followed by GI absorption. For example, the dosage forms for oral composition includes tablets, oral solution or capsules, where drug is absorbed via GI tract.

The term, "sublingual", means literally "under the tongue" and refers to a method of administering substances via the mouth in such a way that the substances are rapidly absorbed via the blood vessels under the tongue rather than via the digestive tract.

The term, "buccally", means buccal dosage form placed in buccal cavity placed between the gum and the cheek where it dissolves in the subject's saliva, releasing the medicament into the buccal cavity in close proximity to the capillary bed of the oral mucosa.

The term "film" includes thin films and sheets, in any shape, including round, oval, rectangular and square. The films described herein may be any desired thickness and size such that it may be placed into the oral cavity of the user. Film size ranges from about 5 to 25 mm×5 to 25 mm in size. Films may be in a single layer or they may be multi-layered, including laminated films. Mechanical properties of films like Film (F) Young's Modulus (Mpa), Max. Tensile Strength (Mpa), Elongation at Break (%), Folding Endurance are found suitable for sublingual film.

The term "therapeutically effective dose" and "therapeutically effective amount" is used interchangeably which is required to achieve desired therapeutic effect.0033] In first aspect, the present invention relates to a transmucosal pharmaceutical composition comprising eliglustat tartrate and a one or more pharmaceutically acceptable excipients which provides enhanced bioavailability and reduces dose of eliglustat in comparison to marketed CERDELGA® capsule which is equivalent to 84 mg of eliglustat.

In second aspect, the present invention relates to a sublingual pharmaceutical composition comprising eliglustat tartrate and a one or more pharmaceutically acceptable excipients.

In third aspect, the present invention relates to a buccal pharmaceutical composition comprising eliglustat tartrate and a one or more pharmaceutically acceptable excipients.

The transmucosal pharmaceutical composition of the present invention may present in the form of tablets, granules, pellets, films, lozenges, wafers, spray, drops, effervescent sublingual or buccal tablets, pastilles or a like thereof.

The sublingual pharmaceutical composition of the present invention may present in the form of tablets, granules, pellets, films, lozenges, wafers, spray, drops, effervescent sublingual or a like thereof.

Further, the pharmaceutical composition of the present invention disintegrates in the oral cavity of a patients about 60 seconds or less, about 50 seconds or less, about 40 seconds or less, about 30 seconds or less or about 20 seconds or less or about 10 seconds or less.

Preferred pharmaceutical compositions are solid pharmaceutical compositions which rapidly disintegrate in the mouth of a subject, upon insertion into the buccal pouch or between the gum and cheek, or upon placement under the tongue without leaving an unpleasant taste in mouth. Rapid disintegration means that the pharmaceutical composition is disintegrated within 60 seconds in water at 37° C., and preferably within 30 seconds.

Further, the pharmaceutical composition of the present invention dissolves or disperses rapidly in the oral cavity after administration.

According to one embodiment of the present invention, there is provided a sublingual pharmaceutical composition of eliglustat or a pharmaceutically acceptable salt thereof, wherein the eliglustat or a pharmaceutically acceptable salt thereof may present in amount from about 1 mg to about 100 mg. Preferably, from about 5 mg to about 50 mg, and more preferably from 10 mg to 30 mg of eliglustat or a pharmaceutically acceptable salt thereof. The eliglustat or a pharmaceutically acceptable salt thereof is present in an amount from about 1% to about 80% by weight of composition, preferably from about 5% to 40% by weight of composition.

According to another embodiment of the present invention, there is provided a sublingual pharmaceutical composition of eliglustat or a pharmaceutically acceptable salt thereof and at least one pharmaceutically acceptable excipient selected from diluents, binders, disintegrants, super-disintegrants, lubricants, glidants, sweetening agents, flavoring agents, taste-masking agents, coloring agents, film-forming agents, coating agents and mixtures thereof.

The diluents used in the pharmaceutical composition of the present invention are selected from the group consisting of maize starch, potato starch, rice starch, wheat starch, pregelatinized starch, lactose monohydrate, lactose anhydrous, microcrystalline cellulose, silicified microcrystalline cellulose, confectioner's sugar, partially hydrolysed gelatin and like thereof. Other useful diluents include, but are not limited to, sugar alcohols such as mannitol, sorbitol, and xylitol, calcium carbonate, magnesium carbonate, dibasic calcium phosphate, and tribasic calcium phosphate. The diluents may present in an amount from about 5% to about 80% by weight of composition, preferably from about 30% to about 80% by weight of composition.

The binders used in the pharmaceutical composition of the present invention are selected from the group consisting of starches, natural and synthetic gums, cellulose derivatives, gelatin, povidone, copovidone, polyethylene glycol, waxes, sodium alginate, alcohols, water, and the like thereof. The binders may present in an amount from about 01% to 20% by weight of composition, preferably from about 3% to 15% by weight of composition, and more preferably from about 1% to about 5% by weight of composition.

The disintegrants and super-disintegrants used in the pharmaceutical composition of the present invention are selected from the group consisting of cross-linked polymer such as crospovidone (crosslinked PVP), modified starches such as sodium starch glycolate, cross-linked cellulose such as crosslinked sodium carboxymethyl cellulose (croscarmellose sodium), low substituted hydroxypropyl cellulose, cross-linked alginic acid, natural polymer such as soy polysaccharides, ion-exchange resins, calcium silicate and mixtures thereof. According to the present invention, preferable disintegrants are crospovidone, croscarmellose sodium and sodium starch glycolate. The disintegrants may present in an amount from about 1% to 30% by weight of composition, preferably from about 1% to 25% by weight of composition, and more preferably employed in an amount in a range of from about 5% to 20% by weight of composition.

The lubricants used in the pharmaceutical composition of the present invention are selected from the group consisting of a calcium stearate, Glyceryl monostearate, Glyceryl palmitostearate, hydrogenated castor oil, hydrogenated vegetable oil, light mineral oil, magnesium stearate, mineral oil, polyethylene glycol, stearic acid, zinc stearate, and sodium stearyl fumarate and a combination thereof. A preferred lubricant is magnesium stearate and sodium stearyl fumarate and may present in amount from about 0% to about 10% by weight of composition, preferably from about 0.5% to about 5% by weight of composition, and more preferably from about 1% to about 2% by weight of composition.

The glidants used in the pharmaceutical composition of the present invention are selected from the group consisting of a starch, talc, lactose, stearates, dibasic calcium phosphate, magnesium carbonate, magnesium oxide, calcium silicate, and colloidal silicon dioxide and the like thereof. The Glidants may present in an amount from about 0% to about 10% by weight of composition, preferably from about 0.5% to about 5% weight of composition more preferably from about 1% to about 2% by weight of composition.

The sweetening agents used in the pharmaceutical composition of the present invention are selected from the group consisting of a alitame, acesulfame potassium, aspartame, D-tryptophan, dextrose, erythritol, fructose, galactose, glycerol, glycyrrhizin, glucose, isomalt, xylitol, xylose, lactitol, lactose, levulose, maltitol, maltodextrin, maltol, maltose, corn syrup, neohesperidin dihydrochalcone, neotame, sodium saccharin, siclamate, sorbitol, sucralose, sucrose, tagatose, taumatin, trehalose, and the like thereof. The sweetening agents may present in an amount of about 10% or less by weight of composition, preferably about 1% or less by weight of composition.

The flavoring agents used in the pharmaceutical composition of the present invention are selected from the group consisting of a natural flavoring oils, anethole, acetic acid, ascorbic acid, phosphoric acid, fumaric acid, lactic acid, lemon, linalool, malic acid, menthol, eucalyptol, orange, cinnamone, tartaric acid, thymol, vanilla, strawberry, cherry Flavor (spray dried naturaltype), chocolate aroma or peppermint aroma and the like thereof. The flavoring agents may present in an amount of about 1% or less by weight of composition, preferably less than about 0.80% or more preferably less than about 0.70% by weight of composition.

The coloring agents used in the pharmaceutical composition of the present invention are selected from the group consisting of natural and/or artificial materials such as FD&C coloring agents, natural juice concentrates, pigments such as titanium oxide, iron oxides, silicon dioxide, and zinc oxide, combinations thereof, and the like. The coloring agents may present in an amount of about 1% or less by weight of composition, preferably less than about 0.80% or more preferably less than about 0.70% by weight of composition.

The film-forming or coating agents used in the pharmaceutical composition of the present invention are selected from the group consisting of cellulose derivatives such as methylcellulose, hydroxymethyl cellulose, hydroxyethyl cellulose, hydroxypropyl cellulose, hydroxymethyl ethylcellulose, hydroxypropyl methylcellulose, sodium carboxymethyl cellulose, and ethyl cellulose; waxes; fat substances; or mixtures thereof. Alternatively, commercially available coating compositions comprising film forming polymers marketed under various trade names, such as Opadry®, may be used for coating.

Examples of solvents used for preparing the coating solution as well as granulating solution are selected from methyl alcohol, ethyl alcohol, isopropyl alcohol, n-butyl alcohol, acetone, acetonitrile, chloroform, methylene chloride, water, or mixtures thereof.

In an another embodiment, the object of the present invention is achieved by employing an effective amount of a pH dependent excipient as a taste-masking agent that is insoluble in acidic environment and soluble in neutral or alkaline conditions, in order to reduce irritation with oral mucosa, such as tongue and mouth mucosa.

The taste-masking agents used in the pharmaceutical composition of the present invention are selected from the group consisting of ion-exchange resins, Opadry® AMB TAN, polymethacrylates (especially Eudragit® L100), sodium starch glycolate, carbopol polymers, PEG-5M, sodium acetate, ethylcellulose, betacyclodextrin, polyvinyl acetate dispersion, trehalose, vinylacetate, polystyrene and cellulose acetate butyrate. Preferably, anionic copolymers based on methacrylic acid and methyl methacrylates such as Eudragit® L100 are used in present invention.

The pharmaceutical composition of the present invention can be obtained by known conventional methods like dry granulation, wet granulation, direct compression, roller compaction, fluidized bed granulation, solid-dispersion, rapid mixture granulation, solvent evaporation, hot-melt extrusion, freeze-drying, lyophilisation, or a like thereof.

The pharmaceutical composition for transmucosal administration of the present invention is characterized by physicochemical properties to evaluate adequate release rate of the active ingredient from composition and also to achieve storage stability e.g. disintegration time, dissolution rate, hardness, friability and stability.

According to another aspect of the present invention, there is provided a formulation comprising a solid dispersion or intimate mixture of a drug and a polymer, wherein said polymers are selected from the group consisting of hypromellose, copovidone, povidone, methyl cellulose, hydroxyethyl cellulose, hydroxypropyl cellulose, ethylcellulose, pyroxylin, polyethylene oxide, polyvinyl alcohol, polyethylene glycol, and polyvinyl caprolactam-polyvinyl acetate-polyethylene glycol, polysaccharides, polypeptides, and methacrylic acid copolymers, ethyl acrylic acid copolymers. A preferred polymer is acrylic products such as poly(meth)acrylate (EUDRAGIT™) copolymers are available in various physical forms, for example, EUDRAGIT EPO being a powder form of EUDRAGIT E 100. The polymers may present in an amount from about 1 to about 60% by weight of composition, preferably from about 5 to about 45% by weight of composition and is more preferably employed in an amount in a range of from about 10 to about 30% by weight of composition.

Optionally, the pharmaceutical composition of the present invention may further be film-coated using techniques well known in the art such as spray coating in a conventional coating pan or a fluidized bed processor or dip coating. Alternatively, coating may also be performed using the hot melt technique. The film coat comprises film-forming polymers, a one or more pharmaceutically acceptable excipients and pharmaceutically acceptable solvents.

According to one of the embodiment of the present invention, there is provided a sublingual pharmaceutical composition comprising from about 1% to about 40% w/w of eliglustat or a pharmaceutically acceptable salt thereof, from about 10% to about 80% w/w of diluent, from about 01 to about 20% w/w of binder, from about 0.5% to about 20% w/w of disintegrant including any super-disintegrant, from about 0% to about 5% w/w of lubricant, from about 0% to about 5% w/w of glidant, from about 10% w/w or less of sweetening agent, from about 10% w/w or less of flavoring agent, from about 0% to about 20% w/w of taste-masking agents, from about 5% w/w or less of coloring agent and optionally from about 1% to about 10% w/w of film coating substance.

According to another embodiment of the present invention, there is provided a sublingual pharmaceutical composition comprising from about 5% to about 30% w/w of eliglustat tartrate, from about 30% to about 70% w/w of diluent, from about 2% to about 8% w/w of binder, from about 5% to about 20% w/w of disintegrant, from about 0% to about 3% w/w of lubricant, from about 0% to about 3% w/w of glidant, from about 5% w/w or less of sweetening agent, from about 5% w/w or less of flavoring agent, from about 0% to about 10% w/w of taste-masking agents, from about 3% w/w or less of coloring agent and optionally from about 1% to about 5% w/w of film coating substance.

Another aspect of the present invention is a process for the preparation of a pharmaceutical composition of the present invention, wherein the process comprises the steps of— Preparing a blend of eliglustat or a pharmaceutically acceptable salt thereof with fillers/diluents; mixing said blend with one or more pharmaceutically acceptable excipients specifically super-disintegrants; subsequently lubricating the blend; and at last directly compressing the lubricated blend into tablets and optionally coating the said composition.

Another aspect of the present invention is a process for the preparation of a pharmaceutical composition of the present invention, wherein the process comprises the steps of— Preparing a dry mixture of eliglustat or a pharmaceutically acceptable salt thereof and fillers/diluents; blending said dry mixture with one or more pharmaceutical excipients specifically super-disintegrants; further solvent is slowly sprayed onto the powder for the granulation purpose; blending the obtained granules with extra-granular excipients and lubricating the blend; at last compressing the obtained lubricated blend to form a tablet and optionally coating the said composition.

Another aspect of the present invention is a process for the preparation of a pharmaceutical composition of the present invention, wherein the process comprises the steps of— blending eliglustat or a pharmaceutically acceptable salt thereof, polymers and one or more pharmaceutical excipients in high shear mixer to obtain granules; loading the granules obtained in into a hot melt extruder to form a pellets in the form of extrudates; milling the extrudates and adding one or more fillers, disintegrants, and lubricants; compressing the granules into tablets and optionally coating the said composition.

Another aspect of the present invention is a process for the preparation of a pharmaceutical composition of the present invention, wherein the process comprises the steps of— Mixing the eliglustat or a pharmaceutically acceptable salt thereof in a matrix consisting of a polymeric structure former, e.g. partially hydrolyzed gelatin, and a saccharide, typically mannitol, dissolved in water and formulated into a liquid solution or suspension; the liquid is precisely filled into pre-formed blisters and passed through a specially designed cryogenic freezing process to control the ultimate size of the ice crystals; the frozen units are then transferred to freeze dryers for the lyophilisation process; the blisters containing the dried units are then sealed via a heat-seal process to protect the product from varying environmental conditions and ensure long-term stability.

In another embodiment of the present invention, there is provided a sublingual film composition comprising therapeutically effective amount of eliglustat or a pharmaceutically acceptable salt and a one or more pharmaceutically acceptable excipients.

In another embodiment, the present invention relates to a sublingual film composition comprising eliglustat or a pharmaceutically acceptable salt thereof and a one or more pharmaceutically acceptable excipients which provides enhanced bioavailability and reduces dose of eliglustat in comparison to marketed CERDELGA® capsule.

According to one embodiment of the present invention, there is provided a sublingual film composition of eliglustat or a pharmaceutically acceptable salt thereof, wherein the eliglustat or a pharmaceutically acceptable salt thereof may present in amount from about 1 mg to about 100 mg. Preferably, from about 5 mg to about 50 mg, and more preferably from 10 mg to 30 mg of eliglustat or a pharmaceutically acceptable salt thereof. The eliglustat or a pharmaceutically acceptable salt thereof is present in an amount from about 1% to about 80% by weight of composition, preferably from about 1% to 20% by weight of composition.

In another aspect, the sublingual film composition of the present invention dissolves rapidly in the oral cavity after administration.

The polymer included in the films may be water-soluble, water-swellable, water-insoluble, or a combination of one or more either water-soluble, water-swellable or water-insoluble polymers. The polymer may include cellulose or a cellulose derivative. Specific examples of useful water-soluble polymers include, but are not limited to, polyethylene oxide, pullulan, hydroxypropylmethyl cellulose, hydroxyethyl cellulose, hydroxypropyl cellulose, polyvinyl pyrrolidone, carboxymethyl cellulose, polyvinyl alcohol, sodium alginate, polyethylene glycol, xanthan gum, tragancanth gum, guar gum, acacia gum, arabic gum, polyacrylic acid, methylmethacrylate copolymer, carboxyvinyl copolymers, starch, or starch derivatives, sodium hyaluronate, gelatin, and combinations thereof. Specific examples of useful water-insoluble polymers include, but are not limited to, ethyl cellulose, hydroxypropyl ethyl cellulose, cellulose acetate phthalate, hydroxypropyl methyl cellulose phthalate and combinations thereof. The polymers may present in an amount from about 20% to 80% by weight of composition, preferably from about 25% to 70% by weight of composition, and more preferably from about 30% to about 60% by weight of composition.

Other polymers useful for incorporation into the films include biodegradable polymers, copolymers, block polymers and combinations thereof. It is understood that the term "biodegradable" is intended to include materials that chemically degrade, as opposed to materials that physically break apart (i.e., bioerodable materials). Among the known useful polymers or polymer classes which meet the above criteria are: poly(glycolic acid) (PGA), poly(lactic acid) (PLA), polydioxanes, polyoxalates, poly(α-esters), polyanhydrides, polyacetates, polycaprolactones, poly(orthoesters), polyamino acids, polyaminocarbonates, polyurethanes, polycarbonates, polyamides, poly(alkyl cyanoacrylates), and mixtures and copolymers thereof. Additional useful polymers include, stereopolymers of L- and D-lactic acid, copolymers of bis(p-carboxyphenoxy)propane acid and sebacic acid, sebacic acid copolymers, copolymers of caprolactone, poly(lactic acid)/poly(glycolic acid)/polyethyleneglycol copolymers, copolymers of polyurethane and (poly(lactic acid), copolymers of polyurethane and poly (lactic acid), copolymers of α-amino acids, copolymers of α-amino acids and caproic acid, copolymers of α-benzyl glutamate and polyethylene glycol, copolymers of succinate and poly(glycols), polyphosphazene, polyhydroxy-alkanoates and mixtures thereof. Binary and ternary systems are contemplated.

A variety of components and fillers also may be added to the films. These may include, without limitation: surfactants; plasticizers; polyalcohols; anti-foaming agents, such as silicone-containing compounds, which promote a smoother film surface by releasing oxygen from the film; thermosetting gels such as pectin, carageenan, and gelatin, which help in maintaining the dispersion of components; inclusion compounds, such as cyclodextrins and caged molecules; coloring agents; taste-masking agents, saliva stimulating agents and flavoring agents. In some embodiments, more than one active component may be included in the film.

Useful additives include, for example, gelatin, vegetable proteins such as sunflower protein, soybean proteins, cotton seed proteins, peanut proteins, grape seed proteins, whey proteins, whey protein isolates, blood proteins, egg proteins, acrylated proteins, water-soluble polysaccharides such as alginates, carrageenans, guar gum, agar-agar, xanthan gum, gellan gum, gum arabic and related gums (gum ghatti, gum karaya, gum tragancanth), pectin, water-soluble derivatives of cellulose: alkylcelluloses hydroxyalkylcelluloses and hydroxyalkylalkylcelluloses, such as methylcelulose, hydroxymethylcellulose, hydroxyethylcellulose, hydroxypropylcellulose, hydroxyethylmethylcellulose, hydroxypropylmethylcellulose, hydroxybutylmethylcellulose, cellulose esters and hydroxyalkylcellulose esters such as cellulose acetate phthalate (CAP), hydroxypropylmethylcellulose (HPMC); carboxyalkylcelluloses, carboxyalkylalkylcelluloses, carboxyalkylcellulose esters such as carboxymethylcellulose and their alkali metal salts; water-soluble synthetic polymers such as polyacrylic acids and polyacrylic acid esters, polymethacrylic acids and polymethacrylic acid esters, polyvinylacetates, polyvinylalcohols, polyvinylacetatephthalates (PVAP), polyvinylpyrrolidone (PVP), PVY/vinyl acetate copolymer, and polycrotonic acids; also suitable are phthalated gelatin, gelatin succinate, crosslinked gelatin, shellac, water-soluble chemical derivatives of starch, cationically modified acrylates and methacrylates possessing, for example, a tertiary or quaternary amino group, such as the diethylaminoethyl group, which may be quaternized if desired; and other similar polymers.

The plasticizers used in the pharmaceutical composition of the present invention are selected from the group consisting of polyalkylene oxides, such as polyethylene glycols, polypropylene glycols, polyethylene-propylene glycols, organic plasticizers with low molecular weights, such as glycerol, glycerol monoacetate, diacetate or triacetate, triacetin, polysorbate, cetyl alcohol, propylene glycol, sorbitol, sodium diethylsulfosuccinate, triethyl citrate, tributyl citrate, and the like. The plasticizers may present in amount from about 0.5% to about 40%, preferably from about 5% to about 20% based on the weight of composition.

The saliva stimulating agents used in the pharmaceutical composition of the present invention are selected from the group consisting of citric acid, malic acid, lactic acid, ascorbic acid or like thereof.

The film compositions further desirably contain a buffer so as to control the local pH of the film composition. Any desired level of buffer may be incorporated into the film composition so as to provide the desired local pH level. The buffer is preferably provided in an amount sufficient to control the release of active ingredient from the film and/or the absorption into the body. The film composition preferably has a local pH of about 5 to about 7.

According to one of the embodiment of the present invention, there is provided a sublingual film composition comprising from about 1% to about 30% w/w of eliglustat tartrate, from about 10% to about 60% w/w of polymer, from about 5 to about 40% w/w of plasticizer, from about 0% to about 20% w/w of saliva stimulating agent, from about 0% to about 10% w/w of sweetening agent, from about 0% to 0.1% w/w of flavoring agent, from about 0% to about 20% w/w of taste-masking agent and optionally from about 5% w/w or less of coloring agent.

The sublingual pharmaceutical film of the present invention can be prepared by known conventional methods like solvent casting method, semisolid casting method, hot melt extrusion, solid dispersion extrusion and rolling method.

The sublingual pharmaceutical film of the present invention is optimised to achieve desired characteristics like film thickness, weight variation, pH, folding endurance, tensile strength, moisture content, in vitro disintegration, in vitro dissolution, in vitro diffusion, content uniformity, microbial analysis or a like thereof.

Further the sublingual pharmaceutical composition of the present invention remains stable by means of components of primary and secondary packaging. Preferably primary packaging in alu-alu pouch, HDPE based packaging, blisters, or bottles and secondary packaging in carton or corrugated boxes.

The pharmaceutical composition of the present invention can be used in the treatment of one or more lysosomal storage diseases selected from the group comprising of, Gaucher disease, Sphingolipidoses, Farber disease, Krabbe disease, Fabry disease, Schindler disease, Tay-Sachs disease and Niemann-Pick disease.

According to another embodiment, the pharmaceutical compositions of the present invention remain stable physically and chemically which fulfils requirement of ICH and/or pharmacopoeia guidelines.

Further the pharmaceutical compositions of the present invention remain stable during its shelf-life period as per ICH and/or pharmacopoeia guidelines.

According to another embodiment of the present invention, administration of transmucosal pharmaceutical composition improves pharmacokinetic profile of eliglustat or its pharmaceutical acceptable salts. This allows reduction in dose of eliglustat or its pharmaceutical acceptable salts to be administered in a patient.

According to the present invention, preferably the transmucosal pharmaceutical composition is selected from sublingual composition and buccal composition.

According to the present invention, the transmucosal composition comprises sublingual pharmaceutical composition which is formulated in the form of sublingual tablet or sublingual film.

According to another embodiment of the present invention, administration of sublingual pharmaceutical composition improves the pharmacokinetic profile of eliglustat or its pharmaceutical acceptable salts. This allows reduction in dose of eliglustat or its pharmaceutical acceptable salts to be administered in a patient.

In another preferred embodiment of the present invention, administration of sublingual film composition improves the pharmacokinetic profile of eliglustat or its pharmaceutical acceptable salts. This allows reduction in dose of eliglustat or its pharmaceutical acceptable salts to be administered in a patient.

In another embodiment, the transmucosal pharmaceutical composition comprising eliglustat or its pharmaceutical acceptable salts and one or more pharmaceutically acceptable excipient which has improved pharmacokinetic profile as compared to the same dose of eliglustat or its pharmaceutical acceptable salts administered by oral pharmaceutical composition.

In another embodiment, the present invention provides the transmucosal pharmaceutical composition comprising eliglustat and its pharmaceutically acceptable salts and one or more pharmaceutically acceptable excipient having improved pharmacokinetic profile which results in increase of bioavailability of eliglustat or its pharmaceutical acceptable salts in comparison to oral pharmaceutical composition In an another embodiment, the transmucosal pharmaceutical composition comprising eliglustat or its pharmaceutical acceptable salts and one or more pharmaceutically acceptable excipient, wherein the composition has improved pharmacokinetic profile and the improved pharmacokinetic profile refers to increase in the AUC of the drug by about 2 times to about 80 times as compared to a corresponding AUC achieved by the same dose of eliglustat or its pharmaceutical acceptable salts administered by oral pharmaceutical composition In an another embodiment, the present invention provides the transmucosal pharmaceutical composition comprising eliglustat and its pharmaceutically acceptable salts thereof and one or more pharmaceutically acceptable excipient; wherein the said composition has improved pharmacokinetic profile and the said improved pharmacokinetic refers to increase in the AUC of the drug by about 80 times to about 70 times; about 70 times to about 60 times; about 60 times to about 50 times; about 50 times to about 40 times; about 40 times to about 35 times; about 35 times to about 30 times; about 30 times to about 20 times; about 20 times to about 15 times; about 15 times to about 10 times; about 10 times to about 5 times; about 5 times to about 3 times; about 3 times to about 2 times; or about 2 times to about 1.5 times or more than the AUC of the same dose of drug given by oral pharmaceutical composition.

In an another embodiment, the present invention provides the transmucosal pharmaceutical composition comprising eliglustat and its pharmaceutically acceptable salts thereof and one or more pharmaceutically acceptable excipient; wherein the said composition has improved pharmacokinetic profile and the said improved pharmacokinetic refers to increase in the AUC of the drug at least about 80 times; at least about 70 times; at least about 60 times; at least about 50 times; at least about 40 times; at least about 35 times; at least about 30 times; at least about 20 times; at least about 15 times; at least about 10 times; at least about 5 times; at least about 3 times; at least about 2 times; or at least about 1.5 times more than the AUC of the same dose of drug given by oral pharmaceutical composition.

In an another embodiment, the present invention provides the sublingual pharmaceutical composition comprising eliglustat and its pharmaceutically acceptable salts thereof and one or more pharmaceutically acceptable excipient; wherein the said composition has improved pharmacokinetic and the said improved pharmacokinetic refers to increase in the AUC of the drug at least about 80 times; at least about 70 times; at least about 60 times; at least about 50 times; at least about 40 times; at least about 35 times; at least about 30 times; at least about 20 times; at least about 15 times; at least about 10 times; at least about 5 times; at least about 3 times; at least about 2 times; or at least about 1.5 times more than the AUC of the same dose of drug given by oral pharmaceutical composition. Preferably, the said improved pharmacokinetic refers to increase in the AUC of the drug at least about 50 times; at least about 40 times; at least about 35 times; at least about 30 times; at least about 20 times; at least about 15 times; at least about 10 times; at least about 5 times; at least about 3 times; at least about 2 times; and at least about 1.5 times more than the AUC of the same dose of drug given by oral pharmaceutical composition. More preferably, and the said improved pharmacokinetic refers to increase in the AUC of the drug at least about 40 times; at least about 35 times; at least about 30 times; at least about 20 times; at least about 15 times; at least about 10 times; at least about 5 times; at least about 3 times; at least about 2 times; or at least about 1.5 times more than the AUC of the same dose of drug given by oral pharmaceutical composition.

In particular embodiment, the transmucosal pharmaceutical composition comprising eliglustat or its pharmaceutical acceptable salts and one or more pharmaceutically acceptable excipient has improved pharmacokinetic profile and the improved pharmacokinetic refers to increase in the AUC of the drug at least by about 1.5 times as compared to a corresponding AUC achieved by the same dose of eliglustat or its pharmaceutical acceptable salts administered by oral pharmaceutical composition In another embodiment, the pharmaceutical composition with improved pharmacokinetic refers to increase in the Cmax of drug significantly in comparison to oral pharmaceutical composition.

In an another embodiment, the present invention provides the transmucosal pharmaceutical composition comprising eliglustat and its pharmaceutically acceptable salts thereof and one or more pharmaceutically acceptable excipient; wherein the said composition has improved pharmacokinetic and the said improved pharmacokinetic refers to increase in the Cmax by at least about 60 times; at least about 50 times; at least about 40 times; at least about 35 times; at least about 30 times; at least about 25 times; at least about 20 times; at least about 15 times; at least about 10 times; at least about 5 times; at least about 4 times; at least about 3 times; at least about 2 times; or at least about 1.5 times or more as compared to oral pharmaceutical composition.

In an another embodiment, the present invention provides the sublingual pharmaceutical composition comprising eliglustat and its pharmaceutically acceptable salts thereof and one or more pharmaceutically acceptable excipient; wherein the said composition has improved pharmacokinetic and the said improved pharmacokinetic refers to increase in the Cmax by at least about 60 times; at least about 50 times; at least about 40 times; at least about 35 times; at least about 30 times; at least about 25 times; at least about 20 times; at least about 15 times; at least about 10 times; at least about 5 times; at least about 4 times; at least about 3 times; at least about 2 times; or at least about 1.5 times or more as compared to oral pharmaceutical composition. Preferably, the said improved pharmacokinetic refers to increase in the Cmax by at least about 40 times; at least about 30 times; at least about 24 times; at least about 20 times; at least about 15 times; at least about 10 times; at least about 5 times; at least about 4 times; at least about 3 times; at least about 2 times; or at least about 1.5 times or more as compared to oral pharmaceutical composition.

In an another embodiment, the transmucosal pharmaceutical composition comprising eliglustat or its pharmaceutical acceptable salts and one or more pharmaceutically acceptable excipient has improved pharmacokinetic profile and the improved pharmacokinetic refers to increase in the $C_{max}$ of the drug by about 2 times to about 60 times as compared to a corresponding $C_{max}$ achieved by the same dose of eliglustat or its pharmaceutical acceptable salts administered by oral pharmaceutical composition.

In an another embodiment, the transmucosal pharmaceutical composition comprising eliglustat or its pharmaceutical acceptable salts and one or more pharmaceutically acceptable excipient has improved pharmacokinetic profile and the improved pharmacokinetic refers to increase in the $C_{max}$ of the drug by about 2 times to about 50 times as compared to a corresponding $C_{max}$ achieved by the same dose of eliglustat or its pharmaceutical acceptable salts administered by oral pharmaceutical composition In an another embodiment, the transmucosal pharmaceutical composition comprising eliglustat or its pharmaceutical acceptable salts and one or more pharmaceutically acceptable excipient has improved pharmacokinetic profile and the improved pharmacokinetic refers to increase in the $C_{max}$ of the drug by about 2 times to about 40 times as compared to a corresponding $C_{max}$ achieved by the same dose of eliglustat or its pharmaceutical acceptable salts administered by oral pharmaceutical composition In an another embodiment, the transmucosal pharmaceutical composition comprising eliglustat or its pharmaceutical acceptable salts and one or more pharmaceutically acceptable excipient has improved pharmacokinetic profile and the improved pharmacokinetic refers to increase in the $C_{max}$ of the drug by about 2 times to about 30 times as compared to a corresponding $C_{max}$ achieved by the same dose of eliglustat or its pharmaceutical acceptable salts administered by oral pharmaceutical composition Dose reduction along with maintaining the pharmacological effect is desirable feature of the formulation. Dose reduction reduces the side effects related to the drug. Also, it is known that eliglustat is a substrate for CYP2D6 and CYP3A enzymes available in liver. Currently approved eliglustat therapy dosing regimen for Gaucher disease type 1 requires determination of types of patient based on FDA cleared test for determining CYP2D6 genotype of patient. The test gives idea about the type of patient, that is the patient is extensive metaboliser, intermediate metaboliser or poor metaboliser. Accordingly, the physician would adjust the dose required by different genotype patient. Additionally, it requires dose adjustment for oral eliglustat by physician to co-administer with other drugs which are CYP2D6 and CYP3A inducer or inhibitors in patients. So it always beneficial that a drug with reduced dose having a different route of administration other than oral, may avoids first pass interaction with such CYP2D6 and CYP3A enzymes. As per the present invention, the dose reduction would expose less amount of drug to CYP2D6 and CYP3A enzymes as compare to oral pharmaceutical composition.

In another embodiment, the pharmaceutical composition of the present invention provides the dosage reduction significantly as compared to oral pharmaceutical composition. In preferred embodiment, the pharmaceutical composition comprising eliglustat or its pharmaceutical acceptable salts and one or more pharmaceutically acceptable excipient, wherein the composition is transmucosal composition with reduced therapeutic dose in comparison to oral pharmaceutical composition and the reduced therapeutic dose provides an equivalent or better therapeutic efficacy in comparison to oral pharmaceutical composition.

In another embodiment, the transmucosal pharmaceutical composition with reduced therapeutic dose comprising eliglustat or its pharmaceutical acceptable salts and one or more pharmaceutically acceptable excipient has the dose of the drug in transmucosal composition at least about 10% lower than that of the orally administered pharmaceutical composition.

In another embodiment, the transmucosal pharmaceutical composition with reduced therapeutic dose comprising eliglustat or its pharmaceutical acceptable salts and one or more pharmaceutically acceptable excipient has the dose of the drug in transmucosal composition by about 20% to about 99% lower than that of the orally administered pharmaceutical composition.

In another embodiment, the transmucosal pharmaceutical composition with reduced therapeutic dose comprising eliglustat or its pharmaceutical acceptable salts and one or more pharmaceutically acceptable excipient has the dose of the drug in transmucosal composition by about 30% to about 99% lower than that of the orally administered pharmaceutical composition.

In another embodiment, the transmucosal pharmaceutical composition with reduced therapeutic dose comprising eliglustat or its pharmaceutical acceptable salts and one or more pharmaceutically acceptable excipient has the dose of the drug in transmucosal composition by about 40% to about 99% lower than that of the orally administered pharmaceutical composition.

In another embodiment, the transmucosal pharmaceutical composition with reduced therapeutic dose comprising eliglustat or its pharmaceutical acceptable salts and one or more pharmaceutically acceptable excipient has the dose of the drug in transmucosal composition by about 50% to about 99% lower than that of the orally administered pharmaceutical composition.

In another embodiment, the transmucosal pharmaceutical composition with reduced therapeutic dose comprising eliglustat or its pharmaceutical acceptable salts and one or more pharmaceutically acceptable excipient has the dose of the drug in transmucosal composition by about 60% to about 99% lower than that of the orally administered pharmaceutical composition.

In another embodiment, the transmucosal pharmaceutical composition with reduced therapeutic dose comprising eliglustat or its pharmaceutical acceptable salts and one or more pharmaceutically acceptable excipient has the dose of the drug in transmucosal composition by about 70% to about 99% lower than that of the orally administered pharmaceutical composition.

In another embodiment, the transmucosal pharmaceutical composition with reduced therapeutic dose comprising eliglustat or its pharmaceutical acceptable salts and one or more pharmaceutically acceptable excipient has the dose of the drug in transmucosal composition by about 80% to about 99% lower than that of the orally administered pharmaceutical composition.

In another embodiment, the transmucosal pharmaceutical composition with reduced therapeutic dose comprising eliglustat or its pharmaceutical acceptable salts and one or more pharmaceutically acceptable excipient has the dose of the drug in transmucosal composition by about 85% to about 90% lower than that of the orally administered pharmaceutical composition.

In another embodiment, the transmucosal pharmaceutical composition with reduced therapeutic dose comprising eliglustat or its pharmaceutical acceptable salts and one or more pharmaceutically acceptable excipient has the dose of the drug in transmucosal composition by about 90% to about 99% lower than that of the orally administered pharmaceutical composition.

In preferred embodiment, the transmucosal pharmaceutical composition is sublingual composition.

In another embodiment, the transmucosal pharmaceutical composition is from buccal composition.

In an another embodiment of invention, the transmucosal pharmaceutical composition with reduced therapeutic dose comprising eliglustat or its pharmaceutical acceptable salts and one or more pharmaceutically acceptable excipient, wherein the said dose of the drug in composition is at least about 10% lower; at least about 20% lower; at least about 30% lower; at least about 40% lower; at least about 45% lower; at least about 50% lower; at least about 55% lower; at least about 60% lower; at least about 65% lower; at least about 70% lower; at least about 75% lower; at least about 80% lower; at least about 85% lower; at least about 90% lower; at least about 95% lower; at least about 99% lower than that of the orally administered pharmaceutical composition.

In an another embodiment of invention, the sublingual pharmaceutical composition with reduced therapeutic dose comprising eliglustat or its pharmaceutical acceptable salts and one or more pharmaceutically acceptable excipient, wherein the said dose of the drug in composition is at least about 10% lower; at least about 20% lower; at least about 30% lower; at least about 40% lower; at least about 45% lower; at least about 50% lower; at least about 55% lower; at least about 60% lower; at least about 65% lower; at least about 70% lower; at least about 75% lower; at least about 80% lower; at least about 85% lower; at least about 90% lower; at least about 95% lower; at least about 99% lower than that of the orally administered pharmaceutical composition.

Preferably, the said dose of the drug in composition is at least about 50% lower; at least about 55% lower; at least about 60% lower; at least about 65% lower; at least about 70% lower; at least about 75% lower; at least about 80% lower; at least about 85% lower; at least about 90% lower; at least about 95% lower; at least about 99% lower than that of the orally administered pharmaceutical composition. More preferably, the said dose of the drug in composition is at least about 60% lower; at least about 65% lower; at least about 70% lower; at least about 75% lower; at least about 80% lower; at least about 85% lower; at least about 90% lower; at least about 95% lower; at least about 99% lower than that of the orally administered pharmaceutical composition. Most preferably, the said dose of the drug in composition is at least about 70% lower; at least about 75% lower; at least about 80% lower; at least about 85% lower; at least about 90% lower; at least about 95% lower; at least about 99% lower than that of the orally administered pharmaceutical composition.

In another embodiment, the transmucosal pharmaceutical composition comprising therapeutically effective amount of eliglustat and its pharmaceutically acceptable salts thereof and one or more pharmaceutically acceptable excipient, wherein the therapeutic amount of the eliglustat or its pharmaceutically acceptable salts is selected from about 0.1 mg to about 30 mg.

In an another embodiment, the present invention provides the transmucosal pharmaceutical composition comprising therapeutically effective amount of eliglustat and its pharmaceutically acceptable salts thereof and one or more pharmaceutically acceptable excipient; wherein the therapeutic amount of the eliglustat or its pharmaceutically acceptable salts is selected from about 0.1 mg to about 30 mg; about 0.1 mg to about 251 mg; about 0.1 mg to about 20 mg. Preferably, the therapeutic amount is selected from about 0.1 mg to about 20 mg; about 0.1 mg to about 15 mg of the drug. More preferably, the therapeutic amount is selected from about 0.1 mg to about 10 mg.

In an another embodiment of invention, the present therapy provides the transmucosal pharmaceutical composition of eliglustat and its pharmaceutically acceptable salts thereof and one or more pharmaceutically acceptable excipient, wherein the composition comprises the amount of drug to be administered is such that it shows equivalent or better therapeutic efficacy as compared to the dose given orally.

In another embodiment of invention, the method of treating the Gaucher's disease type 1, in a human or animal subject, wherein the method comprising transmucosally administering a composition comprising a therapeutically effective amount of eliglustat or its pharmaceutically acceptable salts thereof and one or more pharmaceutically acceptable excipient.

In an another embodiment, a method of treating Gaucher's disease type 1 comprising the administration of transmucosal pharmaceutical composition comprising eliglustat or a pharmaceutically acceptable salt thereof and one or more pharmaceutically acceptable excipient to the subject in need thereof wherein the transmucosal composition has therapeutically effective dose at least 10% lower than the oral pharmaceutical composition; wherein the transmucosal composition provides equal or an improved pharmacokinetic profile in the subject in comparison to the oral pharmaceutical composition. In a preferred embodiment, the method of treating Gaucher's disease type 1 provides the transmucosal composition having therapeutically effective dose about 20% to about 99% lower than the oral transmucosal pharmaceutical composition; wherein the transmucosal composition provides equal or an improved pharmacokinetic profile in the subject in comparison to the oral pharmaceutical composition.

In an another embodiment of invention, the method of treating the Gaucher's disease type 1, in a human or animal subject, wherein the method comprising sublingually administering a composition comprising a therapeutically effective amount of eliglustat or its pharmaceutically acceptable salts thereof and one or more pharmaceutically acceptable excipient.

In an another embodiment of invention, the method of treating the Gaucher's disease type 1, in a human or animal subject, wherein the method comprising sublingually administering a composition comprising a therapeutically-effective amount of eliglustat or its pharmaceutically acceptable salts thereof and one or more pharmaceutically acceptable excipient; and further the dose administered has a improved pharmacokinetic profile as compared to the dose given orally.

In particular, the present invention provides method of treating Gaucher's disease type 1, comprising administering transmucosal pharmaceutical compositions comprising eliglustat or a pharmaceutically acceptable salt thereof and one or more pharmaceutically acceptable excipient, wherein the composition has improved pharmacokinetic profile and at least one of the pharmacokinetic parameter is improved in transmucosal pharmaceutical composition as compared to oral composition and the therapeutically effective dose is at least about 10% lower than that of the orally administered pharmaceutical composition; wherein the pharmacokinetic parameter is selected from $C_{max}$, $AUC_{(0-t)}$ or $AUC_{0-inf}$.

In an another embodiment, the present invention provides method of treating Gaucher's disease type 1, comprising administering sublingual pharmaceutical compositions comprising eliglustat or a pharmaceutically acceptable salt thereof and one or more pharmaceutically acceptable excipient, wherein the composition has improved pharmacokinetic profile and at least one of the pharmacokinetic parameter is improved in sublingual pharmaceutical composition as compared to oral composition and the therapeutically effective dose is at least about 10% lower than that of the orally administered pharmaceutical composition; wherein the pharmacokinetic parameter is selected from $C_{max}$, $AUC_{(0-t)}$ or $AUC_{0-inf}$. Preferably, the method of treating Gaucher's disease type 1 comprises the therapeutically effective dose is at least about 20% lower; at least about 30% lower; at least about 40% lower; at least about 45% lower; at least about 50% lower; at least about 55% lower; at least about 60% lower; at least about 65% lower; at least about 70% lower; at least about 75% lower; at least about 80% lower; at least about 85% lower; at least about 90% lower; at least about 95% lower; at least about 99% lower than that of the orally administered pharmaceutical composition. Preferably, the method of treating Gaucher's disease type 1 comprises the therapeutically effective dose is at least about 50% lower; at least about 55% lower; at least about 60% lower; at least about 65% lower; at least about 70% lower; at least about 75% lower; at least about 80% lower; at least about 85% lower; at least about 90% lower; at least about 95% lower; at least about 99% lower than that of the orally administered pharmaceutical composition. More preferably, the method of treating Gaucher's disease type 1 comprises the therapeutically effective dose is at least about 60% lower; at least about 65% lower; at least about 70% lower; at least about 75% lower; at least about 80% lower; at least about 85% lower; at least about 90% lower; at least about 95% lower; at least about 99% lower than that of the orally administered pharmaceutical composition. Most preferably, the method of treating Gaucher's disease type 1 comprises the therapeutically effective dose is at least about 70% lower; at least about 75% lower; at least about 80% lower; at least about 85% lower; at least about 90% lower; at least about 95% lower; at least about 99% lower than that of the orally administered pharmaceutical composition.

In another embodiment, the method of treating Gaucher's disease type 1 comprises the transmucosal composition which has therapeutically effective dose from about 0.1 mg to about 30 mg.

In an another embodiment of invention, the method of treating the Gaucher's disease type 1, in a human or animal subject, wherein the method comprising sublingually administering a composition comprising a therapeutically-effective amount of eliglustat or its pharmaceutically acceptable salts thereof and one or more pharmaceutically acceptable excipient; and wherein the dose of the eliglustat or its pharmaceutically acceptable salts to be administered via sublingually is about 0.1 mg to about 30 mg; about 0.1 mg to about 25 mg; about 0.1 mg to about 20 mg. Preferably, a method of treatment of Gaucher's disease comprises the therapeutic dose administered via sublingual route is about 0.1 mg to about 20 mg; about 0.1 mg to about 15 mg of the drug. More preferably, the therapeutic dose administered via sublingual route is about 0.1 mg to about 10 mg.

In an another embodiment of invention, the method of treating the Gaucher's disease type 1, in human or animal subject, wherein the method comprising sublingually administering a composition comprising a therapeutically-effective amount of eliglustat or its pharmaceutically acceptable salts thereof and one or more pharmaceutically acceptable excipient; and wherein the sublingual composition has an improved pharmacokinetic having AUC of the at least about 80 times; at least about 70 times; at least about 60 times; at least about 50 times; at least about 40 times; at least about 35 times; at least about 30 times; at least about 20 times; at least about 15 times; at least about 10 times; at least about 5 times; at least about 3 times; at least about 2 times; or at least about 1.5 times more than the AUC of the same dose of drug given by oral pharmaceutical composition. Preferably, the said improved pharmacokinetic refers to increase in the AUC of the drug at least about 50 times; at least about 40 times; at least about 35 times; at least about 30 times; at least about 20 times; at least about 15 times; at least about 10 times; at least about 5 times; at least about 3 times; at least about 2 times; and at least about 1.5 times more than the AUC of the same dose of drug given by oral pharmaceutical composition. More preferably, and the said improved pharmacokinetic refers to increase in the AUC of the drug at least about 40 times; at least about 35 times; at least about 30 times; at least about 20 times; at least about 15 times; at least about 10 times; at least about 5 times; at least about 3 times; at least about 2 times; or at least about 1.5 times more than the AUC of the same dose of drug given by oral pharmaceutical composition.

In an another embodiment, the method of treating Gaucher's disease type 1, wherein the transmucosal pharmaceutical composition provides an improved pharmacokinetic having AUC of the drug about 1.5 to about 80 times more than the AUC of the same dose of eliglustat or its pharmaceutical acceptable salts administered by oral pharmaceutical composition.

The present invention is illustrated below by reference to the following example. However, one skilled in the art will appreciate that the specific methods and results discussed are merely illustrative of the invention, and not to be construed as limiting the invention, as many variations thereof are possible without departing from the spirit and scope of the invention.

EXAMPLES

Example 1: Sublingual Tablet of Eliglustat Prepared by Direct Compression Method

TABLE 1

| Ingredients | Amount % w/w |
| --- | --- |
| Eliglustat tartrate | 5-30 |
| Microcrystalline cellulose | 20-50 |
| Mannitol | 20-30 |
| Sodium starch glycolate | 5-10 |
| Crospovidone | 5-10 |
| Sucralose | 3-7 |
| Menthol | 3-7 |
| Magnesium stearate | 0.1-3 |
| Talc | 0.1-3 |
| Total | 100 |

Procedure for Preparation of Sublingual Tablet of Eliglustat by Direct Compression Method:

1) In a high shear mixer using screen #25 about half of the required quantity of microcrystalline cellulose and mannitol is added, followed by eliglustat tartrate. The remaining quantity of microcrystalline cellulose and mannitol is mixed to above blend for about 5 minutes,
2) To the blend of step 1 crospovidone, sodium starch glycolate, sucralose, menthol and talc are added using screen #25 and mixed for 5 minutes to achieve a uniform blend,
3) The blend from step 2 is transferred to V-blender. Magnesium stearate and talc are added and blended for about 3 minutes and
4) The lubricated blend from step 3 is then compressed into tablets using tablet press.

Example 2: Sublingual Tablet of Eliglustat Prepared by Wet Granulation Method

TABLE 2

| Sr. No. | Ingredients | Amount % w/w |
| --- | --- | --- |
| | Wet Granulation | |
| 1 | Eliglustat tartrate | 5-30 |
| 2 | Mannitol | 20-30 |
| 3 | Copovidone | 1-5 |
| 4 | Crospovidone | 5-10 |
| 5 | Ethyl alcohol* | q.s. |
| | Final Blending | |
| 6 | Mannitol | 20-30 |
| 7 | Crospovidone | 5-10 |
| 8 | Colloidal Silicon Dioxide | 0.1-3 |
| 9 | Sucralose | 3-7 |
| 10 | Menthol | 3-7 |
| 11 | Magnesium Stearate | 0.1-3 |
| | Total | 0 |

*Removed during processing

Procedure for Preparation of Sublingual Tablet of Eliglustat by Wet Granulation Method:

1) In a high shear mixer, required quantity of mannitol (sift using screen #25) is added, followed by eliglustat tartrate (sift using screen #25) and the remaining mannitol and mixed for about 5 minutes, 2) To the blend from step 1, crospovidone and copovidone (sift using screen #25) are added and mixed for 2 minutes to achieve a uniform blend,
3) While the blend from step 2 is still mixing for additional 3 minutes, ethyl alcohol is slowly sprayed onto the powder mix until light granulation is reached,
4) The wet granules are dried in a forced air oven at 50° C. overnight and then passed through screen #40,
5) The dried granules from step 4 are taken in a high shear mixer and the remaining mannitol, crospovidone, colloidal silicon dioxide, sucralose (sift excipients using screen #25) and menthol are added and mixed for 5 minutes to achieve a uniform blend,
6) The blend from step 5 is transferred to V-blender and magnesium stearate (sift using screen #30) is added and blended for about 3 minutes and
7) The lubricated blend from step 6 is then compressed into tablets using tablet press.

Example 3: Sublingual Tablet of Eliglustat Prepared by Cryogenic Freezing Method

TABLE 3

| Ingredients | Amount % w/w |
| --- | --- |
| Eliglustat tartrate | 5-30 |
| Gelatin | 20-50 |
| Mannitol | 40-80 |
| Crospovidone | 5-10 |
| Aspartame | 3-7 |
| Menthol | 3-7 |
| Total | 100 |

Procedure for Preparation of Sublingual Tablet of Eliglustat by Cryogenic Freezing Method:
1) Mixing the eliglustat or a pharmaceutically acceptable salt thereof in a matrix comprising of partially hydrolyzed gelatin, mannitol, crospovidone, aspartame and menthol; dissolved in water and formulated into a liquid solution or suspension,
2) The liquid is precisely filled into pre-formed blisters and passed through a specially designed cryogenic freezing process to control the ultimate size,
3) The frozen units are then transferred to freeze dryers for the lyophilisation and
4) The blisters containing the dried units are then sealed via a heat-seal process.

Example 4: Sublingual Film of Eliglustat

TABLE 4

| Ingredients | A | B | C |
| --- | --- | --- | --- |
| | Amount % w/w | | |
| Eliglustat tartrate | 1-30 | 1-30 | 1-30 |
| Pullulan | 30-60 | NA | 30-60 |
| Hydroxypropyl methylcellulose | NA | 30-60 | NA |
| Glycerin | NA | 15-40 | NA |
| PEG | 15-40 | NA | 15-40 |
| Citric acid | 7-20 | 7-20 | 7-20 |
| Aspartame | 1-8 | 1-8 | 1-8 |
| Sucralose | 2-10 | 2-10 | 2-10 |
| Menthol | 0.01-0.1 | 0.01-0.1 | 0.01-0.1 |
| Distilled water | 10 ml | 10 ml | 10 ml |

Procedure for Preparation of Sublingual Film of Eliglustat:
1) An aqueous solution of the polymers is prepared in distilled water,
2) Eliglustat tartrate is added to the aqueous polymeric solution,
3) Plasticizer is added to above solution,
4) Sweetening agent, saliva stimulating agent and flavoring agent are also added to the above solution and
5) The solution is casted on a petri dish and dried at room temperature for 24 to 48 hrs.

Example 5 to 14: Sublingual Film of Eliglustat

TABLE 5

| | Example | | | | | |
| --- | --- | --- | --- | --- | --- | --- |
| | 5 | | 6 | | 7 | |
| Ingredients | % w/w | mg/strip | % w/w | mg/strip | % w/w | mg/strip |
| Eliglustat tartrate | 21.41 | 8.996 | 25.24 | 9 | 37.2 | 9 |
| KYRON T-134 | 14.8 | 6.22 | — | — | — | — |
| HPMC E 15 | — | — | — | 13.35 | — | — |
| HPMC E 50 | 35.35 | 14.854 | 37.437 | — | 28.4 | 6.87 |
| Glycerol Anhydrous | 9.42 | 3.96 | 10.264 | 3.66 | 9.5 | 2.3 |
| Orange Solid Flavor | 14.14 | 5.94 | 16.657 | 5.94 | 16.5 | 4 |
| SUCRALOSE | 4.81 | 2.02 | 5.665 | 2.02 | 8.26 | 2 |
| Tanocol green color | 0.07 | 0.03 | 0.084 | 0.03 | 0.12 | 0.03 |
| Titanium Dioxide | — | — | 1.66 | 1.66 | — | — |
| Total | 100 | 42.02 | | 35.66 | | 24.2 |

TABLE 6

| | Example | | | |
| --- | --- | --- | --- | --- |
| | 8 | | 9 | |
| Ingredients | % w/w | mg/strip | % w/w | mg/strip |
| Eliglustat tartrate | 29.76 | 10.003 | 42.35 | 10 |
| KYRONT-134 | — | — | — | — |
| HPMC E 15 | 67.83 | 22.8 | 55.061 | 13 |
| HPMC E 50 | — | — | — | — |
| Glycerol Anhydrous | — | — | — | — |
| Orange Solid Flavor | — | — | — | — |
| SUCRALOSE | 2.35 | 0.792 | 2.54 | 0.6 |
| Tanocol green color | 0.06 | 0.021 | 0.04 | 0.01 |
| Titanium Dioxide | — | — | — | — |
| Total | | 33.616 | | 23.61 |

TABLE 7

| | Example | | | | | |
| --- | --- | --- | --- | --- | --- | --- |
| | 10 | | 11 | | 12 | |
| Ingredient | % w/w | mg/strip | % w/w | mg/strip | % w/w | mg/strip |
| Eliglustat tartrate | 74.01 | 10 | 52.63 | 10 | 53.48 | 10 |
| HPMC E 15 | 25.15 | 3.395 | 45.73 | 8.69 | 44.33 | 8.29 |
| Propylene glycol | — | — | — | — | — | — |
| Sucralose | 0.741 | 0.1 | 1.58 | 0.3 | 2.14 | 0.4 |
| Tanocol Green Color | 0.04 | 0.005 | 0.05 | 0.01 | 0.05 | 0.01 |
| Total | 100 | 13.5 | 100 | 19 | 100 | 18.7 |

TABLE 8

| | Example | | | |
|---|---|---|---|---|
| | 13 | | 14 | |
| Component | % w/w | mg/strip | % w/w | mg/strip |
| Eliglustat tartrate | 58.82 | 10 | 62.5 | 10 |
| HPMC E 15 | 35.23 | 6 | 33.38 | 5.34 |
| Propylene glycol | 3.82 | 0.65 | 1.94 | 0.31 |
| Sucralose | 2 | 0.34 | 2.13 | 0.34 |
| Tanocol Green Color | 0.06 | 0.01 | 0.06 | 0.01 |
| Total | 100 | 17 | 100 | 16 |

The compositions were prepared according to the general procedure shown below.

Procedure for Preparation of Sublingual Film of Eliglustat:
1) An aqueous solution of the polymers was prepared in purified water.
2) An aqueous solution of the eliglustat tartrate was prepared in purified water.
3) Eliglustat tartrate solution from step 2) was added to the aqueous polymeric solution from step 1).
4) A plasticizer was added to the solution from step 3).
5) Sweetening agent, saliva stimulating agent and flavoring agent were added to the solution from step 4).
6) The solution from step 5) was casted on a petri dish and dried at room temperature for 24 to 48 hrs.

Examples 15: Sublingual Film of Eliglustat

TABLE 9

| Ingredients | Dry (%) | mg/strip |
|---|---|---|
| Eliglustat tartrate | 62.50 | 5.00 |
| HPMC E 15 | 33.37 | 2.67 |
| Propylene glycol | 1.93 | 0.155 |
| Sucralose | 2.12 | 0.17 |
| Mixture of FD&C Yellow 5 and D&C Blue 1) | 0.063 | 0.05 |
| Purified Water | q.s | q.s |
| Total | 100.000 | 8.04 mg |

Procedure for Preparation
1) HPMC E15 was added to 6 gm of hot purified water (80-90° C.) with gentle stirring until uniform dispersion. The resulting dispersion was kept aside to allow to cool down 20-30° C.
2) Eliglustat tartrate was added to 3 gm of purified water at 20-30° C., with stirring at 200-250 RPM.
3) Colouring agent was added to the solution from step 2) and stirred for 15 minutes at 200-250 RPM
4) Solution with colouring agent from step 3) was added to the dispersion from step 1) and stirred for 30 min at 200-250 RPM.
5) propylene glycol was added to the solution from step 4) and stirred for 15 min at 200-250 RPM.
6) Remaining quantity of purified water was added to the solution from step 5) and stir for 15 min at 200-250 RPM.
7) Solution from step 6) was casted on glass plate using film forming machine and dried in oven at 60° C. for approx. 1 hour. The dried film was cut in required dimension.
8) The films were packed into triple layered aluminium pouch and sealed.
9) The sealed films from step 8) were stored at room temperature.

Example 16: Sublingual Tablet Preparation

TABLE 10

| Ingredients | % w/w | mg |
|---|---|---|
| Eliglustat tartrate | 13.8 | 5 |
| Mannitol | 69.4 | 25 |
| Sodium starch glycolate | 13.88 | 5 |
| Magnesium stearate | 0.83 | 0.3 |
| Total | 100 | 36 |

Procedure for Preparation
1) In a high shear mixer using screen #25 about half of the required quantity of mannitol was added, followed by eliglustat tartrate. The remaining quantity of mannitol was mixed to above blend for about 5 minutes,
2) To the blend of step 1 sodium starch glycolate was added using screen #25 and mixed for 5 minutes to achieve a uniform blend,
3) The blend from step 2 was transferred to V-blender. Magnesium stearate was added and blended for about 3 minutes and
4) The lubricated blend from step 3 was then compressed into tablets using tablet press.

Example 17: Sublingual Tablet Preparation

TABLE 11

| Ingredients | Amount % w/w | mg |
|---|---|---|
| Eliglustat tartrate | 7.8 | 5 |
| Polyvinyl Pyrrolidine | 3.21 | 2 |
| Mannitol | 78 | 50 |
| Crospovidone | 7.8 | 5 |
| Aspartame | 1.5 | 1 |
| Menthol | 1.5 | 1 |
| Total | 100 | 64 |

Procedure for Preparation
1) In a high shear mixer using screen #25 about half of the required quantity of polyvinyl pyrrolidine and mannitol were added, followed by eliglustat tartrate. The remaining quantity of polyvinyl pyrrolidine and mannitol were mixed to above blend for about 5 minutes,
2) To the blend of step 1 crospovidone, aspartame, and menthol were added using screen #25 and mixed for 5 minutes to achieve a uniform blend,
3) The blend from step 2 was transferred to V-blender and blended for about 3 minutes and
4) The lubricated blend from step 3 was compressed into tablets using tablet press.

Example 18: Animal In-Vivo Studies

Figure 2:
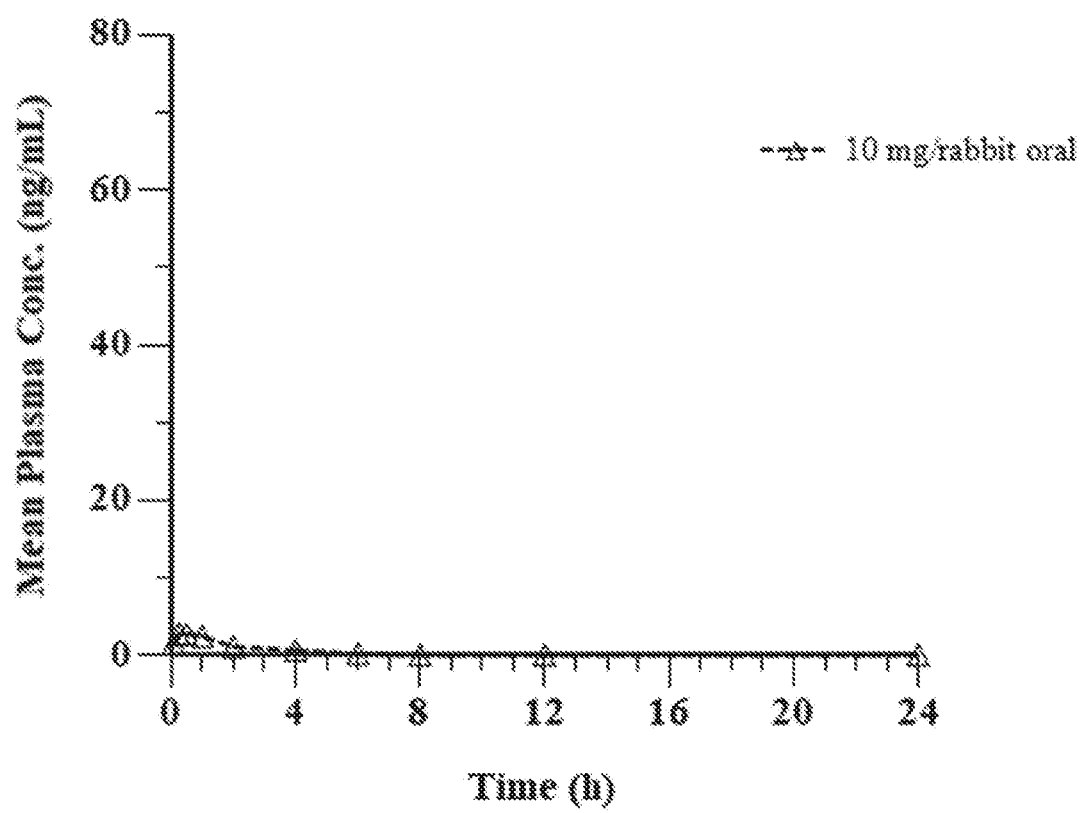
FIG. 2 is a graph showing concentration-time profile of Eliglustat tartrate following oral administration of Eliglustat tartrate formulation in male New Zealand White Rabbits.
Figure 3:
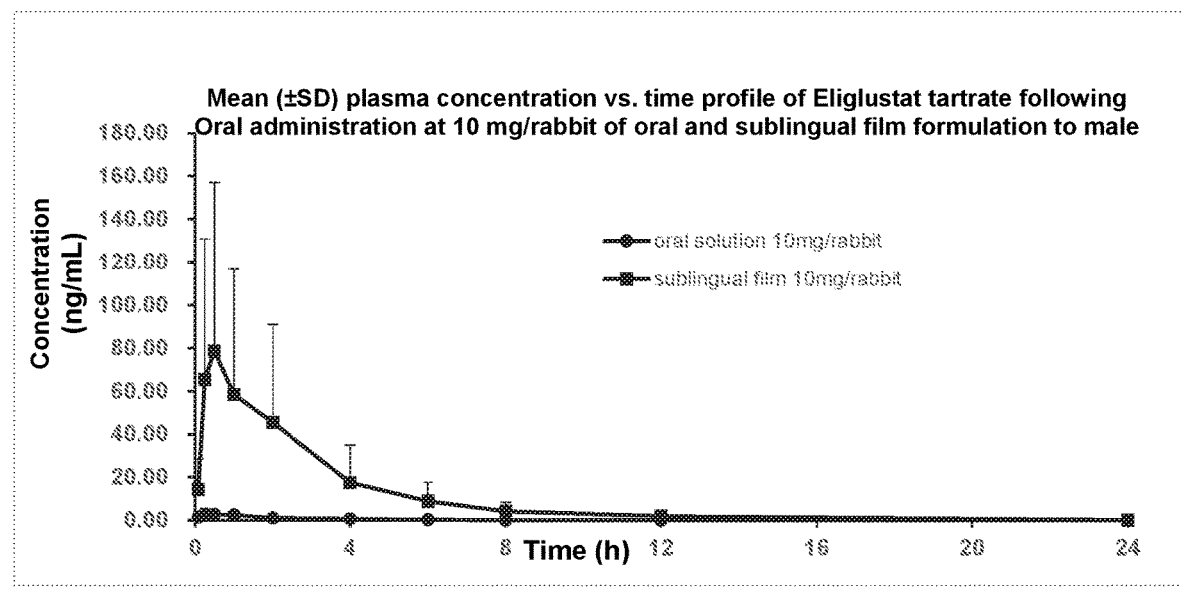
FIG. 3 is graph showing overlay of concentration-time profile of Eliglustat tartrate following sublingual administration Oral thin film (sublingual) and oral administration of Eliglustat tartrate formulation in male New Zealand White Rabbits

Rabbit study was carried out to compare a sublingual 10 mg Eliglustat tartrate. A total of three Rabbits were studied and the results are graphed in FIGS. 1 & 2 and tabulated in Table 12. The PK studies show that bioavailability of the sublingual Eliglustat tartrate was about 36 times more compared to oral Eliglustat tartrate composition. The PK data confirms superior attributes of the sublingual over orally administered dosage forms of the disclosure.

Pharmacokinetic Trial

A comparative pharmacokinetic study using sublingual thin film compositions and oral formulation compositions was performed in male New Zealand white Rabbits. Animals.

The sublingual film compositions of the disclosure were placed below the tongue of the sublingual group of anesthetized rabbit and blood samples were collected at various time points. At the end of 120 seconds, sublingual cavity of rabbit was observed visually to identify any non-disintegrated film fragments. No non-disintegrated film fragments were observed.

The oral compositions of eliglustat tartrate were administered in the oral group of anesthetized rabbits. The oral eliglustat compositions were administered orally by gavage as a solution, using a suction catheter attached to a plastic disposable syringe and blood samples were collected at various time points.

Bioanalysis of samples was performed using a fit-for-purpose LC-MS/MS method

Table 12 Summarizes Pharmacokinetic Parameters of Eliglustat Tartrate Following Sublingual Administration and Oral Administration, in Male New Zealand White Rabbits

TABLE 12

| Treatment | Route | $T_{max}$ (h) | $C_{max}$ (ng/mL) | $AUC_{0-t}$ (h · ng/mL) | $AUC_{0-inf}$ (h · ng/mL) | $MRT_{last}$ (h) | $t_{1/2}$ (h) |
|---|---|---|---|---|---|---|---|
| Eliglustat tartrate | Sublingual | 0.667 ± 0.289 | 79.4 ± 51.6 | 226 ± 107 | 232 ± 106 | 2.72 ± 0.359 | 2.55 ± 0.511 |
| | Oral Dosing | 0.583 ± 0.382 | 3.31 ± 2.11 | 6.31 ± 4.85 | 9.60 ± 6.04 | 1.53 ± 0.546 | 2.35 ± 0.341 |

The data from this study (Table 12/FIGS. 1 & 2) demonstrates that the sublingual administration of the compositions of the disclosure substantially increased Cmax, $AUC_{0-t}$, and $AUC_{0-inf}$ as compared to oral administration of the oral composition.

The invention claimed is:

1. A sublingual pharmaceutical composition comprising from about 45% to about 80% of eliglustat or a pharmaceutically acceptable salt thereof by weight of the sublingual composition and at least one or more pharmaceutically acceptable excipients; wherein the sublingual composition comprises an amount of from about 0.1 mg to about 30 mg of eliglustat or a pharmaceutically acceptable salt thereof; wherein the sublingual composition, following administration to a subject, provides an increase in $AUC_{(0-inf)}$ of eliglustat of at least about 20 times compared to the $AUC_{(0-inf)}$ of eliglustat provided by administration of an oral pharmaceutical composition absorbed through the gastrointestinal tract of the subject that comprises the same dose of the eliglustat or a pharmaceutically acceptable salt thereof as the sublingual composition; and wherein the sublingual composition is formulated in the form of sublingual film comprising a polymer and a plasticizer.

2. The sublingual pharmaceutical composition according to claim 1, wherein the sublingual composition, following administration to a subject, provides an increase in Cmax of eliglustat of at least about 1.5 times as compared to the Cmax of eliglustat provided by administration of an oral composition absorbed through the gastrointestinal tract of the subject that comprises the same dose of eliglustat or a pharmaceutically acceptable salt thereof as the sublingual composition .

3. The sublingual pharmaceutical composition according to claim 1, wherein the increase in the $AUC_{(0-inf)}$ of eliglustat is from about 20 times to about 80 times.

4. The sublingual pharmaceutical composition according to claim 3, wherein the increase in the $AUC_{(0-inf)}$ of eliglustat is from about 20 times to about 30 times.

5. The sublingual pharmaceutical composition according to claim 2, wherein the increase in the Cmax of eliglustat is from about 2 times to about 60 times.

6. The sublingual pharmaceutical composition according to claim 5, wherein the increase in the Cmax of eliglustat is about 24 times.

7. A method of treating Gaucher's disease type 1 in a subject in need thereof, comprising administering to the subject a sublingual pharmaceutical composition comprising from about 45% to about 80% of eliglustat or a pharmaceutically acceptable salt thereof by weight of the sublingual composition and at least one or more pharmaceutically acceptable excipients; wherein the sublingual composition comprises an amount of from about 0.1 mg to about 30 mg of eliglustat or a pharmaceutically acceptable salt thereof; and wherein the sublingual composition, following administration to a subject, provides an increase in $AUC_{(0-inf)}$ of eliglustat of at least about 20 times as compared to $AUC_{(0-inf)}$ of eliglustat provided by administration of an oral pharmaceutical composition absorbed through the gastrointestinal tract of the subject that comprises the same dose of the eliglustat or a pharmaceutically acceptable salt thereof as the sublingual composition; and wherein the sublingual composition is formulated in the form of sublingual film comprising a polymer, and a plasticizer.

8. The method of treating Gaucher's disease type 1 according to claim 7, wherein the therapeutically effective dose in the sublingual composition is about 60% to about 99% lower than the oral composition.

9. The method of treating Gaucher's disease type 1 according to claim 7, wherein the sublingual pharmaceutical composition provides an increase in the $AUC_{(0-inf)}$ of eliglustat of about 20 times to about 30 times.

10. The method of treating Gaucher's disease type I according to claim 7, wherein the sublingual pharmaceutical composition comprises from about 0.1 mg to about 10 mg of eliglustat or a pharmaceutically acceptable salt thereof.

11. A sublingual pharmaceutical composition comprising from about 45% to about 80% of eliglustat or a pharmaceutically acceptable salt thereof by weight of the sublingual composition and at least one or more pharmaceutically acceptable excipients; wherein the sublingual composition comprises an amount of from about 0.1 mg to about 30 mg of eliglustat or a pharmaceutically acceptable salt thereof; and wherein the sublingual composition has a therapeutically effective dose of eliglustat or a pharmaceutically acceptable salt thereof of about 50% to about 99% lower than that of an oral pharmaceutical composition of eliglustat or a pharmaceutically acceptable salt thereof absorbed through the gastrointestinal tract of a subject; wherein the lower therapeutically effective dose of eliglustat or a pharmaceutically acceptable salt thereof provides an equivalent or better therapeutic efficacy in comparison to the oral pharmaceutical composition; wherein the sublingual composition, following administration to a subject at a same therapeutic dose as the oral composition absorbed through the gastrointestinal tract of the subject, provides an increase in $AUC_{(0-inf)}$ of eliglustat of at least about 20 times compared to the $AUC_{(0-inf)}$ of eliglustat provided by administration of the oral composition; and wherein the sublingual composition is formulated in the form of sublingual film comprising a polymer in an amount from about 10% w/w to about 60% w/w, a plasticizer in an amount of about 0.5% w/w to about 40% w/w, and a sweetening agent in an amount of about 10% w/w or less.

12. The sublingual pharmaceutical composition according to claim 11, wherein the therapeutically effective dose of eliglustat or a pharmaceutically acceptable salt thereof in the sublingual composition is about 60% to about 99% lower than that of the oral pharmaceutical composition.

13. The sublingual pharmaceutical composition according to claim 1, wherein the composition provides an increase in $AUC_{(0-inf)}$ of eliglustat of at least about 20 times and an increase in Cmax of eliglustat of at least about 20 times as compared to the $AUC_{(0-inf)}$ and Cmax provided by an oral pharmaceutical composition absorbed through the gastrointestinal tract that comprises the same dose of eliglustat or a pharmaceutically acceptable salt thereof.

14. The sublingual composition according to claim 1, wherein the polymer is a water-soluble polymer selected from the group consisting of hydroxypropylmethyl cellulose, hydroxyethyl cellulose, hydroxypropyl cellulose, polyvinyl pyrrolidone, carboxymethyl cellulose, polyvinyl alcohol, sodium alginate, polyethylene glycol, xanthan gum, tragancanth gum, guar gum, acacia gum, arabic gum, polyacrylic acid, methylmethacrylate copolymer, carboxyvinyl copolymers, starch, water-soluble chemical derivatives of starch, sodium hyaluronate, gelatin, and mixtures thereof.

15. The sublingual composition according to claim 14, wherein the plasticizer is selected from the group consisting of polyethylene glycol, polypropylene glycol, polyethylene-propylene glycol, glycerol, glycerol monoacetate, glycerol diacetate, glycerol triacetate, triacetin, polysorbate, cetyl alcohol, propylene glycol, sorbitol, sodium diethylsulfosuccinate, triethyl citrate, tributyl citrate, and mixtures thereof.

16. The sublingual composition according to claim 15, wherein the polymer is hydroxypropylmethyl cellulose and the plasticizer is propylene glycol.

17. The sublingual composition according to claim 7, wherein the polymer is hydroxypropylmethyl cellulose and the plasticizer is propylene glycol.

* * * * *